(12) United States Patent
Huo et al.

(10) Patent No.: US 12,456,438 B2
(45) Date of Patent: Oct. 28, 2025

(54) GATE DRIVING CIRCUIT AND DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Peirong Huo, Beijing (CN); Changcheng Liu, Beijing (CN); Jingyi Xu, Beijing (CN); Chao Liang, Beijing (CN); Zhenhong Xiao, Beijing (CN); Peng Liu, Beijing (CN); Wei Yan, Beijing (CN); Jiantao Liu, Beijing (CN); Bo Li, Beijing (CN); Hong Liu, Beijing (CN)

(73) Assignees: ORDOS YUANSHENG OPTOELECTRONICS CO., LTD., Inner Mongolia (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/563,532

(22) PCT Filed: Jun. 30, 2022

(86) PCT No.: PCT/CN2022/103086
§ 371 (c)(1),
(2) Date: Nov. 22, 2023

(87) PCT Pub. No.: WO2024/000496
PCT Pub. Date: Jan. 4, 2024

(65) Prior Publication Data
US 2025/0078772 A1    Mar. 6, 2025

(51) Int. Cl.
G09G 3/36 (2006.01)
G09G 3/00 (2006.01)
G11C 19/28 (2006.01)

(52) U.S. Cl.
CPC ......... *G09G 3/3677* (2013.01); *G11C 19/287* (2013.01); *G09G 2300/0426* (2013.01);
(Continued)

(58) Field of Classification Search
CPC ......... G09G 3/3677; G09G 2300/0426; G09G 2300/0819; G09G 2310/0286;
(Continued)

(56) References Cited

U.S. PATENT DOCUMENTS

| 8,422,620 B2 | 4/2013 | Su |
| 9,773,466 B2 | 9/2017 | Wang |

(Continued)

FOREIGN PATENT DOCUMENTS

| CN | 1892798 A | 1/2007 |
| CN | 202084307 U | 12/2011 |

(Continued)

OTHER PUBLICATIONS

Written Opinion from PCT/CN2022/103086 dated Dec. 5, 2022.
(Continued)

*Primary Examiner* — Pegeman Karimi
(74) *Attorney, Agent, or Firm* — Calfee, Halter & Griswold LLP

(57) ABSTRACT

The present disclosure provides a gate driving circuit and a display panel. The display panel includes a display area and a peripheral area surrounding the display area. At least one gate driving circuit is arranged in the peripheral area. The at least one gate driving circuit includes a plurality of shift register units cascaded in sequence. The plurality of shift register units include first shift register units and second shift (Continued)

register units. The first shift register units and the second shift register units are spaced apart from each other. The number of transistors in the first shift register units is smaller than the number of transistors in the second shift register units.

16 Claims, 8 Drawing Sheets

(52) U.S. Cl.
CPC ............... *G09G 2300/0819* (2013.01); *G09G 2310/0286* (2013.01)

(58) Field of Classification Search
CPC ......... G09G 2310/0267; G09G 3/3266; G09G 3/20; G11C 19/287; G11C 19/28
See application file for complete search history.

(56) References Cited

U.S. PATENT DOCUMENTS

| | | | |
|---|---|---|---|
| 10,490,295 | B2 | 11/2019 | Mi |
| 11,862,065 | B2 * | 1/2024 | Li .................. G09G 3/2096 |
| 2011/0002437 | A1 | 1/2011 | Su |
| 2016/0358570 | A1 | 12/2016 | Wang |
| 2017/0115808 | A1 | 4/2017 | Cho |
| 2017/0124955 | A1 | 5/2017 | Wang |
| 2017/0147127 | A1 | 5/2017 | Sun |
| 2018/0336957 | A1 | 11/2018 | Mi |
| 2020/0075113 | A1 | 3/2020 | Yuan |
| 2021/0035516 | A1 * | 2/2021 | Cao .................. G11C 19/287 |
| 2021/0304659 | A1 | 9/2021 | Qing et al. |
| 2022/0036788 | A1 * | 2/2022 | Shi .................... G09G 3/20 |
| 2022/0157263 | A1 * | 5/2022 | Moon ................ G09G 3/3233 |
| 2023/0141543 | A1 * | 5/2023 | Gu .................... G11C 19/28 345/206 |

FOREIGN PATENT DOCUMENTS

| | | |
|---|---|---|
| CN | 102956269 A | 3/2013 |
| CN | 103400559 A | 11/2013 |
| CN | 103985363 A | 8/2014 |
| CN | 106157912 A | 11/2016 |
| CN | 106448595 A | 2/2017 |
| CN | 106548740 A | 3/2017 |
| CN | 107452350 A | 12/2017 |
| CN | 108230981 A | 6/2018 |
| CN | 106448595 B | 11/2018 |
| CN | 108806581 A | 11/2018 |
| CN | 108877636 A | 11/2018 |
| CN | 109147711 A | 1/2019 |
| CN | 109417711 A | 1/2019 |
| CN | 109147711 B | 2/2019 |
| CN | 109872636 A | 6/2019 |
| CN | 110322826 A | 10/2019 |
| CN | 107452350 B | 12/2019 |
| CN | 110619838 A | 12/2019 |
| CN | 111415695 A | 7/2020 |
| CN | 111653228 A | 9/2020 |
| CN | 112735315 A | 4/2021 |
| CN | 108806581 B | 8/2021 |
| EP | 3549125 A1 | 10/2019 |
| JP | 2016110684 A | 6/2016 |
| KR | 20170124425 S | 11/2017 |
| KR | 20190081075 A | 7/2019 |
| WO | 2018054260 A1 | 3/2018 |
| WO | 2018099047 A1 | 6/2018 |
| WO | 2018235130 A1 | 12/2018 |
| WO | 2021018206 A1 | 2/2021 |
| WO | 2021174675 A1 | 9/2021 |

OTHER PUBLICATIONS

Office action from Chinese Application No. 202280002048.9 dated Feb. 20, 2023.
Office action from Chinese Application No. 202280002048.9 dated Jan. 18, 2023.
International Search Report from PCT/CN2022/103086 dated Dec. 5, 2022.
Partial Supplementary European Search Report of application No. 22948599.0 dated Oct. 29, 2024.
Extended European Search Report of application No. 22948599.0 dated Feb. 11, 2025.

* cited by examiner

GATE DRIVING CIRCUIT AND DISPLAY DEVICE

CROSS REFERENCE TO RELATED APPLICATION(S)

This application is a 371 application of PCT/CN2022/103086, which was filed on Jun. 30, 2022, the entire contents of which are incorporated herein by reference in their entireties.

TECHNICAL FIELD

The present disclosure relates to the display technical field, and in particular, to a gate driving circuit and a display panel.

BACKGROUND

With the developments of display technologies, the application range of narrow bezel products is getting increasingly wide. Generally, a gate driving circuit needs to be provided on an edge of a display panel, and too large size of the gate driving circuit may restrict the narrowing of the bezel of the display panel.

It should be noted that the information disclosed in the background section above is only used to enhance the understanding of the background of the present disclosure, and therefore may include information that does not constitute the prior art known to those skilled in the art.

SUMMARY

The purpose of the present disclosure is to provide a gate driving circuit and a display panel to overcome the shortcoming(s) of the above-mentioned related art, thereby reducing the bezel of the display panel.

According to an aspect of the present disclosure, there is provided a display panel, including a display area and a peripheral area surrounding the display area. At least one gate driving circuit is arranged in the peripheral area, and each of the at least one gate driving circuit includes a plurality of shift register units cascaded in sequence;
  wherein the plurality of shift register units include first shift register units and second shift register units, the first shift register units and the second shift register units are spaced apart from each other, and the number of transistors in the first shift register units is smaller than the number of transistors in the second shift register units.

According to an implementation of the present disclosure, the display area is provided with a plurality of pixel driving circuits, signals output by at least part of the first shift register units and signals output by at least part of the second shift register units are used to drive the pixel driving circuit.

According to an implementation of the present disclosure, the at least one gate driving circuit is provided on a side of the display area in a row direction;
  wherein the peripheral area is provided with a first circuit area for arranging a first shift register unit among the first shift register units and a second circuit area for arranging a second shift register unit among the second shift register units; and
  wherein a partial area of the second circuit area is located on a side of the first circuit area away from the display area.

According to an implementation of the present disclosure, each of the at least one gate driving circuit includes a plurality of shift register unit groups, and each of the shift register unit groups includes a first shift register unit and a second shift register unit which are adjacent to each other;
  wherein in a same shift register unit group, a first circuit area corresponding to a first shift register unit and a second circuit area corresponding to a second shift register unit are complementary to form a rectangle.

According to an implementation of the present disclosure, the display panel is provided with an inner line group and an outer line group corresponding to the at least one gate driving circuit, driving lines in the inner line group and the outer line group are all used to drive the at least one gate driving circuit, and the inner line group is located on a side of the outer line group close to the display area;
  wherein each of the shift register unit groups is electrically connected to any one of the driving lines in the outer line group through at most one interconnection line.

According to an implementation of the present disclosure, the outer line group includes a first low-level signal line, a reset control line, a first scan control line and a second scan control line which extend along a column direction;
  wherein a first shift register unit and a second shift register unit, which are located in two different shift register unit groups and are adjacent to each other, are electrically connected to a same first low-level signal line;
  wherein the reset control line is used to provide a reset control signal to the shift register unit groups;
  wherein the first scan control line is used to provide a first scan control signal to the shift register unit groups, the second scan control line is used to provide a second scan control signal to the shift register unit groups, and one of the first scan control signal and the second scan control signal is an inverted signal of another one of the first scan control signal and the second scan control signal.

According to an implementation of the present disclosure, at least one of the first shift register units includes a first input transistor and a second input transistor, and at least one of the second shift register units includes a first input transistor and a second input transistor;
  wherein the first input transistor is located between the first input transistor and the outer line group, and is arranged along the row direction;
  wherein the second input transistor is located between the second input transistor and the outer line group, and is arranged along the row direction;
  wherein a source of the first input transistor and a source of the first input transistor are electrically connected to the first scan control line through a same conductive structure;
  wherein a source of the second input transistor and a source of the second input transistor are electrically connected to the second scan control line through a same conductive structure.

According to an implementation of the present disclosure, at least one of the first shift register units includes:
  a first input transistor, wherein a source of the first input transistor is used to be applied with the first scan control signal, a drain of the first input transistor is electrically connected to a pull-up node, and a gate of the first input transistor is used to be electrically connected to an output terminal of a preceding-stage shift register unit;

a second input transistor, wherein a source of the second input transistor is used to be applied with the second scan control signal, a drain of the second input transistor is electrically connected to the pull-up node, and a gate of the second input transistor is electrically connected to a pull-down node and used to be electrically connected to an output terminal of a next-stage shift register unit, and one of the first scan control signal and the second scan control signal is an inverted signal of another one of the first scan control signal and the second scan control signal;

a third capacitor having a first electrode plate of the third capacitor and a second electrode plate of the third capacitor, wherein the second electrode plate of the third capacitor is electrically connected to the pull-up node, and the first electrode plate of the third capacitor is electrically connected to an output terminal of the first shift register unit;

a first output transistor, wherein a drain of the first output transistor is electrically connected to the first electrode plate of the third capacitor, a gate of the first output transistor is electrically connected to the pull-up node, and one of a source of the first output transistor of the first shift register unit and a source of a first output transistor of an adjacent shift register unit is used to be applied with a first clock signal, and the other one of the source of the first output transistor of the first shift register unit and the source of the first output transistor of the adjacent shift register unit is used to be applied with a second clock signal, and one of the first clock signal and the second clock signal is an inverted signal of the other one of the first clock signal and the second clock signal;

a second output transistor, wherein a source of the second output transistor is used to be applied with a low-level signal, a drain of the second output transistor is electrically connected to the first electrode plate of the third capacitor, and a gate of the second output transistor is electrically connected to the pull-down node; and a pull-down control transistor, wherein a source of the pull-down control transistor is used to be applied with the low-level signal, a drain of the pull-down control transistor is electrically connected to the pull-down node, and a gate of the pull-down control transistor is electrically connected to the gate of the first input transistor.

According to an implementation of the present disclosure, the first input transistor includes two sub-transistors connected in series, and the two sub-transistors have a common gate;

wherein the second input transistor includes two sub-transistors connected in series, and the two sub-transistors have a common gate.

According to an implementation of the present disclosure, at least one of the first shift register units further includes:

a touch control transistor, wherein a source of the touch control transistor is used to be applied with the low-level signal, a drain of the touch control transistor is electrically connected to the first electrode plate of the third capacitor, and a gate of the touch control transistor is used to be applied with a touch control signal.

According to an implementation of the present disclosure, at least one of the second shift register unit includes:

a first input transistor, wherein a source of the first input transistor is used to be applied with a first scan control signal, a drain of the first input transistor is used to be electrically connected to a pull-up control node, and a gate of the first input transistor is used to be electrically connected to an output terminal of a preceding-stage shift register unit;

a second input transistor, wherein a source of the second input transistor is used to be applied with a second scan control signal, a drain of the second input transistor is used to be electrically connected to the pull-up control node, and a gate of the second input transistor is used be electrically connected to an output terminal of a next-stage shift register unit, and one of the first scan control signal and the second scan control signal is an inverted signal of the other one of the first scan control signal and the second scan control signal;

a first capacitor including a first electrode plate of the first capacitor and a second electrode plate of the first capacitor, wherein the first electrode plate of the first capacitor is electrically connected to an output terminal of the second shift register unit, and the second electrode plate of the first capacitor is electrically connected to a pull-up node;

a second capacitor comprising a first electrode plate of the second capacitor and a second electrode plate of the second capacitor, wherein the first electrode plate of the second capacitor is electrically connected to a pull-down node, and the second electrode plate of the second capacitor is used to be applied with a low-level signal;

a first output transistor, wherein a drain of the first output transistor is electrically connected to the pull-up node, and a drain of the first output transistor is electrically connected to the first electrode plate of the first capacitor, and one of a source of the first output transistor of the second shift register unit and a source of a first output transistor of an adjacent shift register unit is used to be applied with a first clock signal, and the other one of the source of the first output transistor of the second shift register unit and the source of the first output transistor of the adjacent shift register unit is used to be applied with a second clock signal, and one of the first clock signal and the second clock signal is an inverted signal of the other one of the first clock signal and the second clock signal;

a second output transistor, wherein a source of the second output transistor is used to be applied with the low-level signal, a drain of the second output transistor is electrically connected to the first electrode plate of the first capacitor, and a gate of the second output transistor is electrically connected to the pull-down node;

a first pull-down transistor, wherein a source of the first pull-down transistor is used to be applied with the low-level signal, a drain of the first pull-down transistor is electrically connected to the pull-up control node, and a gate of the first pull-down transistor is electrically connected to the pull-down node;

a first pull-down control transistor, wherein a source of the first pull-down control transistor is used to be applied with the low-level signal, a drain of the first pull-down control transistor is electrically connected to the pull-down node, and a gate of the first pull-down control transistor is electrically connected to the pull-up control node;

a second pull-down control transistor, wherein a drain of the second pull-down control transistor is electrically connected to the pull-down node, and a gate of the second pull-down control transistor is electrically connected to a source of the second pull-down control transistor, and one of the source of the second pull-down control transistor and the source of the first output transistor is used to be applied with the first clock signal, and the other one of the source of the second pull-down control transistor and the source of the first output transistor is used to be applied with the second clock signal;

a second pull-down transistor, wherein a source of the second pull-down transistor is used to be applied with the low-level signal, a drain of the second pull-down transistor is electrically connected to the pull-down node, and a gate of the second pull-down transistor is electrically connected to the first electrode plate of the first capacitor; and a reset transistor, wherein a source of the reset transistor is used to be applied with the low-level signal, a drain of the reset transistor is electrically connected to the pull-up control node, and a gate of the reset transistor is used to be applied with a reset control signal;

wherein the pull-up control node is electrically connected to the pull-up node.

According to an implementation of the present disclosure, the first input transistor includes two sub-transistors connected in series, and the two sub-transistors have a common gate;

wherein the second input transistor includes two sub-transistors connected in series, and the two sub-transistors have a common gate.

According to an implementation of the present disclosure, at least one of the second shift register units further comprises an enable transistor and a touch control transistor, and the pull-up control node and the pull-up node are electrically connected through the enable transistor;

wherein a source of the enable transistor is electrically connected to the pull-up control node, a drain of the enable transistor is electrically connected to the pull-up node, and a gate of the enable transistor is used to be applied with a high-level signal;

wherein a source of the touch control transistor is electrically connected to the low-level signal, a drain of the touch control transistor is electrically connected to the first electrode plate of the first capacitor, and a gate of the touch control transistor is used to be applied with a touch control signal, and one of the touch control signal and the high-level signal is an inverted signal of the other one of the touch control signal and the high-level signal.

According to an implementation of the present disclosure, the display panel includes two gate driving circuits, and the two gate driving circuits are respectively located on both sides of the display area;

wherein pixel driving circuits in any one row are simultaneously driven by the two gate driving circuits.

According to an implementation of the present disclosure, pixel driving circuits in any one row are driven by a first shift register unit in one of the gate driving circuits, and are driven by a second shift register unit in the other one of the gate driving circuits.

According to a second aspect of the present disclosure, there is provided a gate driving circuit, including a plurality of shift register units cascaded in sequence, wherein the plurality of shift register units include first shift register units and second shift register units, the first shift register units and the second shift register units are spaced apart from each other, and the number of transistors in the first shift register units is smaller than the number of transistors in the second shift register units.

According to an implementation of the present disclosure, each of the shift register units is used to drive a row of pixel driving circuits.

According to an implementation of the present disclosure, at least one of the first shift register units includes:

a first input transistor, wherein a source of the first input transistor is used to be applied with a first scan control signal, a drain of the first input transistor is electrically connected to a pull-up node, and a gate of the first input transistor is used to be electrically connected to an output terminal of a preceding-stage shift register unit;

a second input transistor, wherein a source of the second input transistor is used to be applied with a second scan control signal, a drain of the second input transistor is electrically connected to the pull-up node, and a gate of the second input transistor is electrically connected to a pull-down node and is used to be electrically connected to an output terminal of a next-stage shift register unit, and one of the first scan control signal and the second scan control signal is an inverted signal of the other one of the first scan control signal and the second scan control signal;

a third capacitor having a first electrode plate of the third capacitor and a second electrode plate of the third capacitor, wherein the second electrode plate of the third capacitor is electrically connected to the pull-up node, and the first electrode plate of the third capacitor is electrically connected to an output terminal of the first shift register unit;

a first output transistor, wherein a drain of the first output transistor is electrically connected to the first electrode plate of the third capacitor, a gate of the first output transistor is electrically connected to the pull-up node, and one of a source of the first output transistor of the first shift register unit and a source of a first output transistor of an adjacent shift register unit is used to be applied with a first clock signal, and the other one of the source of the first output transistor of the first shift register unit and the source of the first output transistor of the adjacent shift register unit is used to be applied with a second clock signal, and one of the first clock signal and the second clock signal is an inverted signal of the other one of the first clock signal and the second clock signal;

a second output transistor, wherein a source of the second output transistor is used to be applied with a low-level signal, a drain of the second output transistor is electrically connected to the first electrode plate of the third capacitor, and a gate of the second output transistor is electrically connected to the pull-down node;

a pull-down control transistor, wherein a source of the pull-down control transistor is used to be applied with the low-level signal, a drain of the pull-down control transistor is electrically connected to the pull-down node, and a gate of the pull-down control transistor is electrically connected to the gate of the first input transistor.

According to an implementation of the present disclosure, the first input transistor includes two sub-transistors connected in series, and the two sub-transistors have a common gate;

wherein the second input transistor includes two sub-transistors connected in series, and the two sub-transistors have a common gate.

According to an implementation of the present disclosure, at least one of the second shift register units includes:

a first input transistor, wherein a source of the first input transistor is used to be applied with a first scan control signal, a drain of the first input transistor is used to be electrically connected to a pull-up control node, and a gate of the first input transistor is used to be electrically connected to an output terminal of a preceding-stage shift register unit;

a second input transistor, wherein a source of the second input transistor is used to be applied with a second scan control signal, a drain of the second input transistor is used to be electrically connected to the pull-up control node, a gate of the second input transistor is used to be electrically connected to an output terminal of a next-stage shift register unit, and one of the first scan control signal and the second scan control signal is an inverted signal of the other one of the first scan control signal and the second scan control signal;

a first capacitor including a first electrode plate of the first capacitor and a second electrode plate of the first capacitor, wherein the first electrode plate of the first capacitor is electrically connected to an output terminal of the second shift register unit, and the second electrode plate of the first capacitor is electrically connected to a pull-up node;

a second capacitor including a first electrode plate of the second capacitor and a second electrode plate of the second capacitor, wherein the first electrode plate of the second capacitor is electrically connected to a pull-down node, and the second electrode plate of the second capacitor is used to be applied with a low-level signal;

a first output transistor, wherein a drain of the first output transistor is electrically connected to the pull-up node, a drain of the first output transistor is electrically connected to the first electrode plate of the first capacitor, and one of a source of the first output transistor of the second shift register unit and a source of a first output transistor of an adjacent shift register unit is used to be applied with a first clock signal, and the other one of the source of the first output transistor of the second shift register unit and the source of the first output transistor of the adjacent shift register unit is used to be applied with a second clock signal, and one of the first clock signal and the second clock signal is an inverted signal of the other one of the first clock signal and the second clock signal;

a second output transistor, wherein a source of the second output transistor is used to be applied with the low-level signal, a drain of the second output transistor is electrically connected to the first electrode plate of the first capacitor, and a gate of the second output transistor is electrically connected to the pull-down node;

a first pull-down transistor, wherein a source of the first pull-down transistor is used to be applied with the low-level signal, a drain of the first pull-down transistor is electrically connected to the pull-up control node, and a gate of the first pull-down transistor is electrically connected to the pull-down node;

a first pull-down control transistor, wherein a source of the first pull-down control transistor is used to be applied with the low-level signal, a drain of the first pull-down control transistor is electrically connected to the pull-down node, and a gate of the pull-down control transistor is electrically connected to the pull-up control node;

a second pull-down control transistor, wherein a drain of the second pull-down control transistor is electrically connected to the pull-down node, a gate of the second pull-down control transistor is electrically connected to a source of the second pull-down control transistor, and one of the source of the second pull-down control transistor and the source of the first output transistor is used to be applied with the first clock signal, and the other one of the source of the second pull-down control transistor and the source of the first output transistor is used to be applied with the second clock signal;

a second pull-down transistor, wherein a source of the second pull-down transistor is used to be applied with the low-level signal, a drain of the second pull-down transistor is electrically connected to the pull-down node, and a gate of the second pull-down transistor is electrically connected to the first electrode plate of the first capacitor; and a reset transistor, wherein a source of the reset transistor is used to be applied with the low-level signal, a drain of the reset transistor is electrically connected to the pull-up control node, and a gate of the reset transistor is used to be applied with a reset control signal;

wherein the pull-up control node is electrically connected to the pull-up node.

According to an implementation of the present disclosure, the first input transistor includes two sub-transistors connected in series, and the two sub-transistors have a common gate;

wherein the second input transistor includes two sub-transistors connected in series, and the two sub-transistors have a common gate.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the present disclosure and together with the specification serve to explain the principles of the present disclosure. Apparently, the drawings in the following description are only some embodiments of the present disclosure, and those skilled in the art may obtain other drawings according to these drawings without creative efforts.

DETAILED DESCRIPTION

Figure 1:
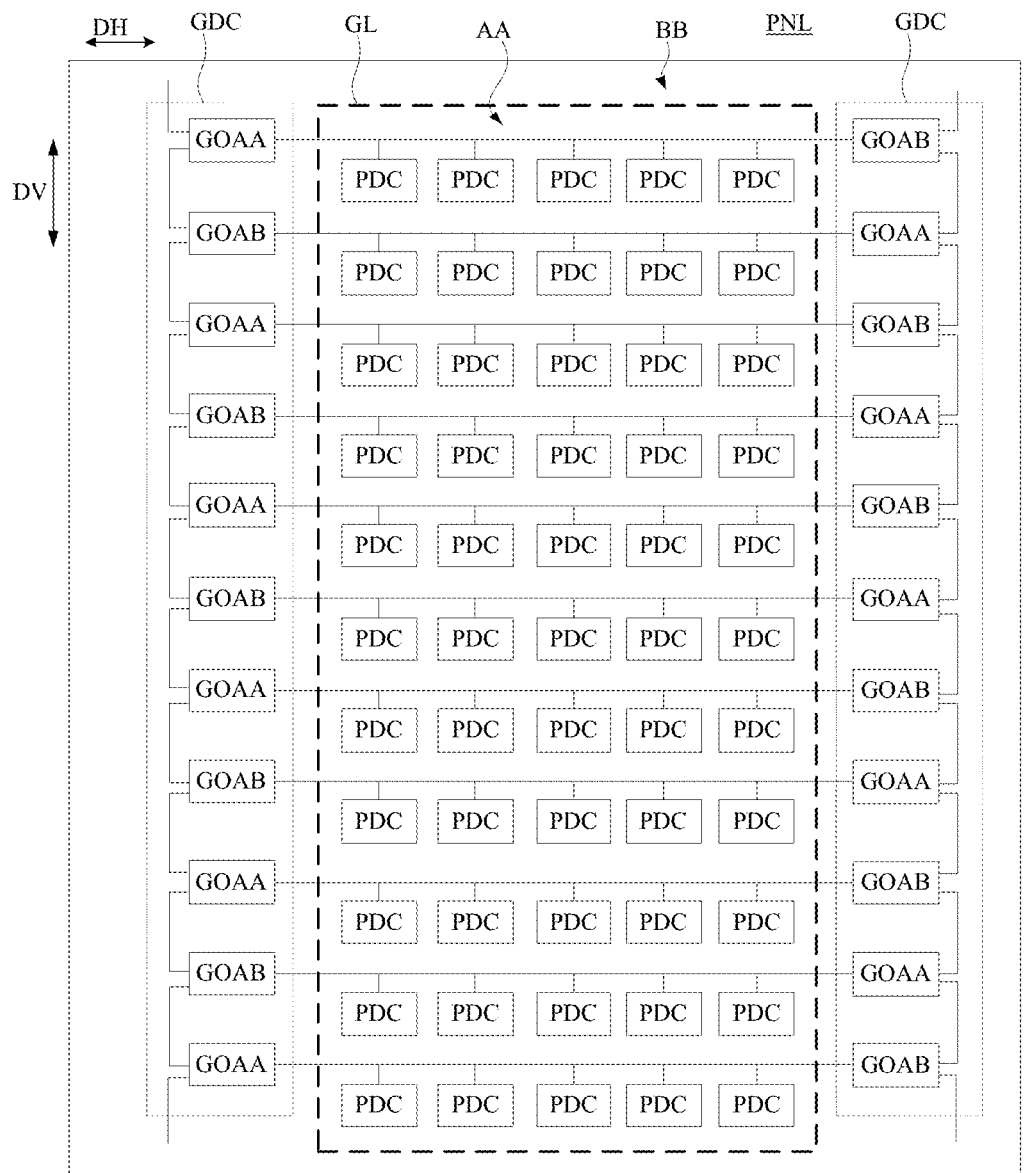
FIG. 1 is a schematic structural diagram of a display panel in an implementation of the present disclosure.

Example implementations will now be described more fully with reference to the accompanying drawings. Example implementations can, however, be embodied in many forms and should not be construed as being limited to the implementations set forth herein; rather, these implementations are provided so that the present disclosure will be thorough and complete, and will fully convey the concept of example implementations to those skilled in the art. The same reference numerals in the drawings denote the same or similar structures, and thus their repeated descriptions will be omitted. Furthermore, the drawings are merely schematic illustrations of the present disclosure and are not necessarily drawn to scale.

Although relative terms such as "upper" and "lower" are used in the specification to describe a relative relationship of one component shown in a figure to another component, the terms are used in the specification only for convenience, for example, the terms are based on a direction shown in examples in the drawings. It should be appreciated that if an illustrated device is turned over so that it is upside down, then an element described as being "upper" will become an element being "lower". When a structure is "on" another structure, it may mean that the structure is integrally formed on another structure, or that the structure is "directly" placed on another structure, or that the structure is "indirectly" placed on another structure through other structure(s).

The terms "one", "a/an", "the", "said" and "at least one" are used to indicate the presence of one or more elements/components/etc.; the terms "comprising/comprises/comprise" and "having/has/have" are used to indicate an open-ended inclusive, and means that there may be additional elements/components/etc. in addition to the listed elements/components/etc. The words "first", "second" and "third" are used as markers only, but are not used to limit the number of objects.

A transistor refers to an element including at least three terminals: a gate, a drain, and a source. A transistor has a channel region between a drain electrode (drain electrode terminal, drain region, or drain electrode) and a source electrode (source electrode terminal, source region, or source electrode), and current can flow through the drain, channel region and source. The channel region refers to a region through which current mainly flows. In a case where transistors with opposite polarities are used, or where the direction of current changes during circuit operation, the functions of "source" and "drain" may be interchanged. Therefore, in this specification, "source" and "drain" can be interchanged with each other.

A structural layer A being located on a side of a structural layer B away from a base substrate may be understood as: the structural layer A is formed on the side of the structural layer B away from the base substrate. When the structural layer B is a patterned structure, a part of the structure of the structural layer A may also be located at the same physical height as the structural layer B or lower than the physical height of the structural layer B, where the base substrate is a height reference.

The present disclosure provides a display panel PNL and a gate driving circuit GDC for driving the display panel PNL. Referring to FIG. 1, the display panel PNL includes a display area AA and a peripheral area BB surrounding the display area AA. In the display area AA, there are sub-pixels and pixel driving circuits PDC for driving the sub-pixels. Each of the sub-pixels may be a light valve or a self-luminous element. Under the control of a pixel driving circuit PDC, each sub-pixel emits light independently, so that the display panel PNL displays images.

For example, in an implementation of the present disclosure, the display panel PNL may be a liquid crystal display panel, which includes an array substrate and a color filter substrate arranged in opposite to form a cell, and the liquid crystal cell formed by the array substrate and the color filter substrate is filled with liquid crystal. In this way, a sub-pixel may be used a light valve in a liquid crystal unit. The liquid crystal unit includes two electrodes for controlling an electric field and liquid crystal that deflects or falls under the control of the electric field. One of the two electrodes may be used as a pixel electrode, and the other may be used as a common electrode. Respective common electrodes may be electrically connected to each other to be jointly applied with a common voltage. The pixel driving circuits PDC may be electrically connected to the pixel electrodes in a one-to-one correspondence, so as to control voltages on the pixel electrodes to adjust the electric field in the area corresponding to the pixel electrodes, and thus control the deflection or falling degree of the liquid crystal in the area corresponding to the pixel electrodes. In this way, the display panel PNL can control the light transmittance of each sub-pixel under the cooperation of an upper polarizer and a lower polarizer.

For another example, in an implementation of the present disclosure, the display panel PNL may be a display panel with self-luminous elements, and the self-luminous elements include but are not limited to OLED, PLED, QLED, Q-OLED, Micro LED, Mini LEDs, etc. The display panel PNL may include a base substrate BP, a driving layer, and a pixel layer that are sequentially stacked. The light-emitting elements are arranged in the pixel layer as sub-pixels, and the driving layer is provided with pixel driving circuits PDC for driving the sub-pixels. The pixel driving circuits PDC may control the magnitude of the current flowing through the light-emitting elements, and thus control the light-emitting brightness of the light-emitting elements.

Referring to FIG. 1, the display panel PNL may further be provided with scan lines GL extending along a row direction DH and driving data lines extending along a column direction DV. The pixel driving circuits PDC may be electrically connected to the scan lines GL and the driving data lines. Under the control of scan signals on the scan lines GL, the pixel driving circuits PDC may receive driving data applied on the driving data lines, and thus control the brightness of the sub-pixels according to the received driving data. Exemplarily, a pixel driving circuit PDC may include a data writing transistor, a control terminal of the data writing transistor is electrically connected to a scan line GL, and an input terminal of the data writing transistor is electrically connected to a driving data line. When a scan signal is applied on the scan line GL, the data writing transistor is turned on, so that the driving data applied on the driving data line is written into a capacitor of the pixel driving circuit PDC. When no scan signal is applied on the scan line GL, the data writing transistor is electrically turned off, so that the driving data applied on the driving data line cannot be written into the capacitor of the pixel driving circuit PDC.

Referring to FIG. 1, a gate driving circuit GDC may be arranged on a side of the display area AA for applying scan signals to respective scan lines GL. Optionally, the gate driving circuit GDC is arranged on a side of the display area AA along a row direction DH. The gate driving circuit GDC may include a plurality of shift register units GOA cascaded in sequence, and each scan line GL may be electrically connected to an output terminal of one shift register unit GOA. In this way, when the shift register unit GOA outputs a scan signal, the scan signal may be applied to the scan line GL. In the related art, all the shift register units GOA in the gate driving circuit GDC are identical, and are arranged sequentially along a column direction DV. However, this arrangement may lead to a large area occupied by the gate driving circuit GDC, and such large area may further increase the bezel of the display panel PNL, which is not conducive to narrowing of the bezel of the display panel PNL.

In an embodiment of the present disclosure, two different types of shift register units GOA are set in a gate driving circuit GDC, that is, first shift register units GOAA and second shift register units GOAB. The number of transistors in a first shift register unit GOAA is smaller than the number of transistors in a second shift register unit GOAB (e.g., the number of transistors in each of the first shift register units GOAA is smaller than the number of transistors in each of the second shift register units GOAB). In a cascade relationship, the first shift register units GOAA and the second shift register units GOAB are spaced apart from each other. In this way, the pixel driving circuit PDC of the present disclosure includes a plurality of shift register units GOA cascaded in sequence. The shift register units GOA include two types: the first shift register units GOAA and the second shift register units GOAB. The first shift register units GOAA and the second shift register units GOAB are spaced apart from each other.

In this way, in the gate driving circuit GDC of the present disclosure, by alternately arranging the first shift register units GOAA and the second shift register units GOAB, the gate driving circuit GDC can utilize the functions and benefits (such as higher stability, etc.) brought by the second shift register units GOAB which have more transistors, and the gate driving circuit GDC can also reduce the overall number of required transistors by setting the first shift register units GOAA, and the stability of the gate driving circuit GDC itself can be improved by means of the second shift register units GOAB, and the problem of insufficient functions faced when all shift register units in the gate driving circuit GDC adopt the first shift register units GOAA can be overcome. In this way, the gate driving circuit GDC of the present disclosure not only avoids the problem of too many transistors faced when all shift register units in the gate driving circuit GDC adopt the second shift register units GOAB, but also avoids the problem of insufficient overall functions faced when all shift register units in the gate driving circuit GDC adopt the first shift register units GOAA. The functions of the gate driving circuit GDC is supplemented on the overall level through the second shift register units GOAB which are arranged alternately between the first shift register units GOAA.

In an implementation of the present disclosure, referring to FIG. 1, the display area AA is provided with a plurality of pixel drive circuits PDC. Signals output by at least part of the first shift register units GOAA and signals output by at least part of the second shift register units GOAB are used to drive the pixel driving circuits PDC. In other words, in the implementation, both the first shift register units GOAA and the second shift register units GOAB have the capability to drive the pixel drive circuits PDC, which can reduce the number of shift register units GOA in the gate driving circuit GDC, and further reduce the area of the gate driving circuit GDC.

In one example, referring to FIG. 1, respective shift register units GOA in the pixel driving circuit PDC are arranged in a one-to-one correspondence with the scan lines GL, and each shift register unit GOA is capable of driving a corresponding scan line GL.

Figure 2:
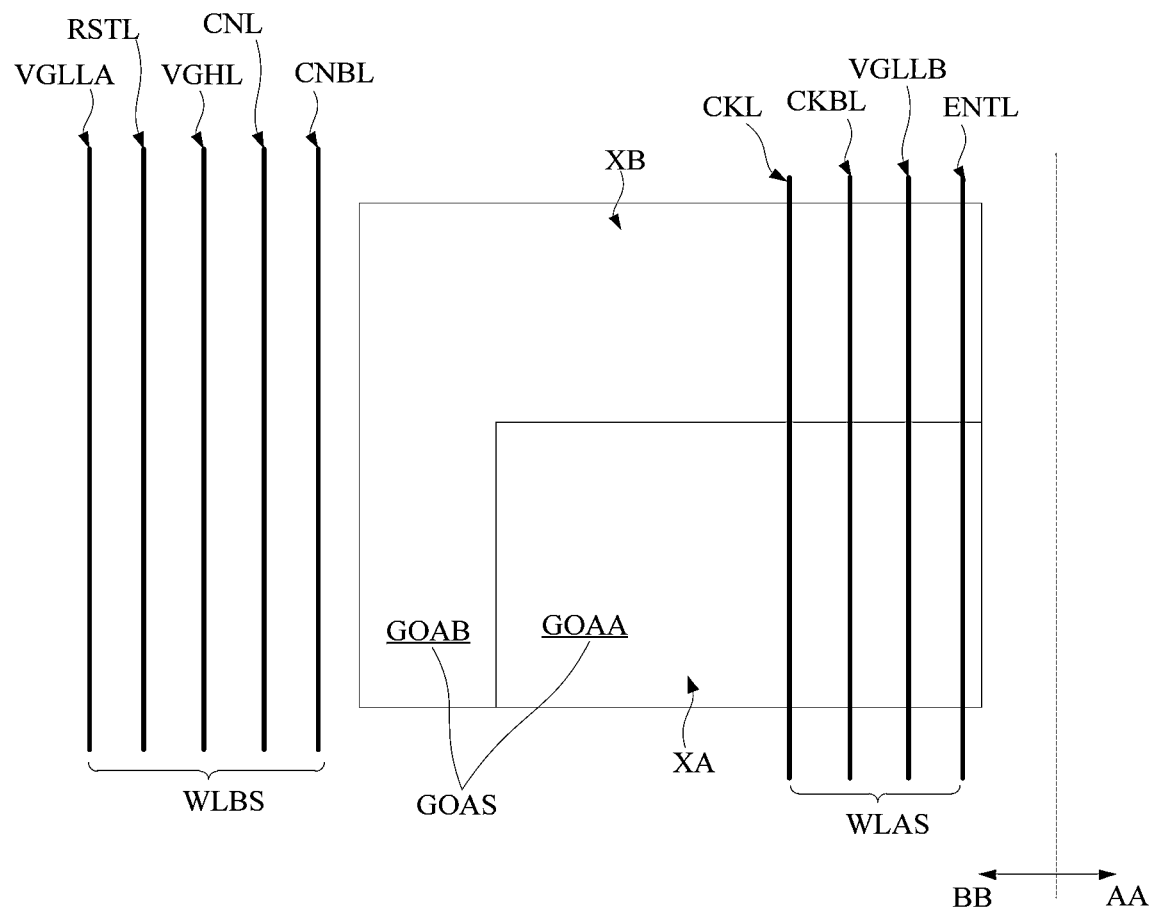
FIG. 2 is a schematic diagram showing distribution of a gate driving circuit in an implementation of the present disclosure.

In an implementation of the present disclosure, referring to FIG. 2, the gate driving circuit is arranged on a side of the display area AA in the row direction DH. The peripheral area BB is provided with a first circuit area XA for arranging a first shift register unit GOAA and a second circuit area XB for arranging a second shift register unit GOAB. A partial area of the second circuit area XB is located on a side of the first circuit area XA away from the display area AA. In this way, some transistors in each of the second shift register units GOAB can be arranged on a side of the first shift register unit GOAA away from the display area AA. On the one hand, this can reduce the size of the second shift register unit GOAB in the row direction, thereby reducing the bezel width of the display panel PNL. On the other hand, this can prevent the second circuit area XB from being arranged between the first circuit area XA and the display area AA, thereby preventing the output line of the first shift register unit GOAA from penetrating through the second circuit area XB to drive the scan line GL; accordingly, this can avoid parasitic capacitance caused by overlapping, etc.

Optionally, referring to FIG. 2, the gate driving circuit includes a plurality of shift register unit groups GOAS. Each shift register unit group GOAS includes a first shift register unit GOAA and a second shift register unit GOAB which are adjacent to each other. In the same shift register unit group GOAS, the first circuit area XA corresponding to the first shift register unit GOAA and the second circuit area XB corresponding to the second shift register unit GOAB are complementary to form a rectangle. In other words, in the example of FIG. 2, the first circuit area XA for arranging the first shift register unit GOAA and the second circuit area XB for arranging the second shift register unit GOAB are complementary to form a rectangular, then the first shift register unit GOAA and the second shift register unit GOAB can serve as a shift register unit group GOAS. This arrangement can make the layout of the gate driving circuit GDC more compact, reduce area waste and facilitate the reduction of the bezel of the display panel PNL.

Figure 3:
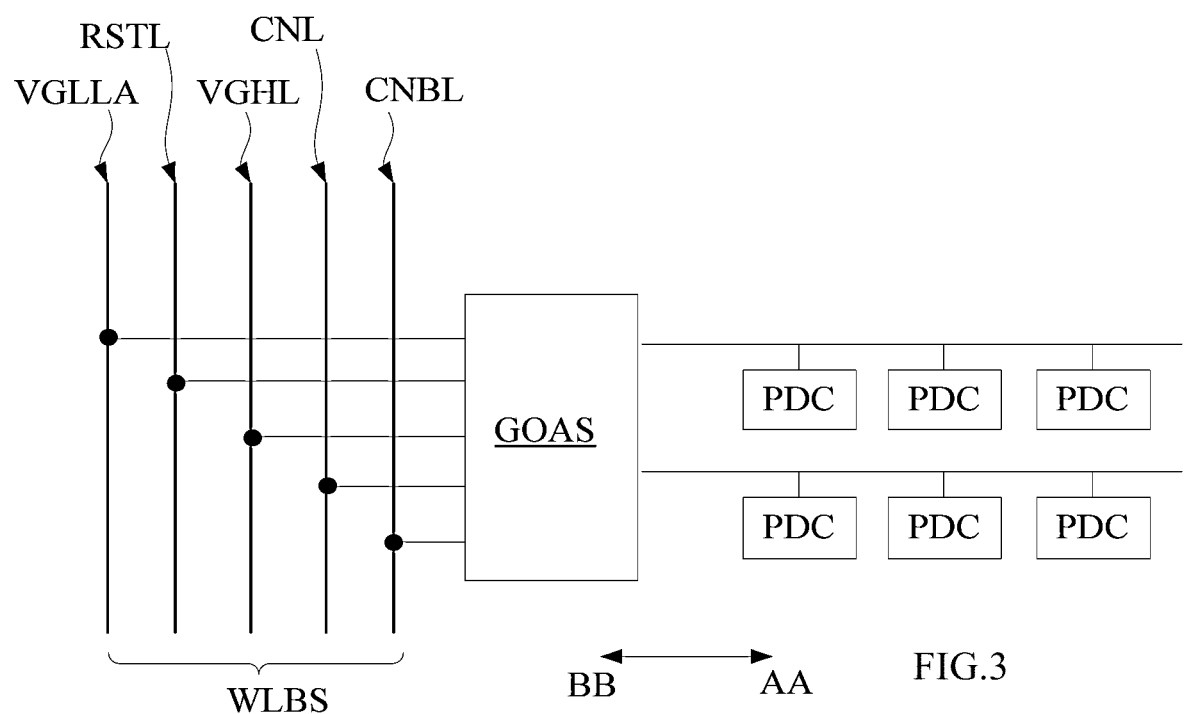
FIG. 3 is a schematic diagram of distribution of a gate driving circuit in an implementation of the present disclosure.

In an implementation of the present disclosure, referring to FIG. 2 and FIG. 3, the display panel PNL is provided with an inner line group WLAS and an outer line group WLBS corresponding to the gate driving circuit. The driving lines in the inner line group WLAS and the outer line group WLBS are both used to drive the gate driving circuit, and the inner line group WLAS is located at a side of the outer line group WLBS close to the display area AA. The shift register unit group GOAS is electrically connected to any one of the driving lines of the outer line group WLBS through at most one interconnection line. In this way, the first shift register unit GOAA and the second shift register unit GOAB in the shift register unit group GOAS do not need to be independently electrically connected to the driving lines in the outer line group WLBS through interconnection lines, which can reduce overlap between lines, thereby reducing impedance and crosstalk, and improving the stability of the gate driving circuit GDC.

Figure 8:
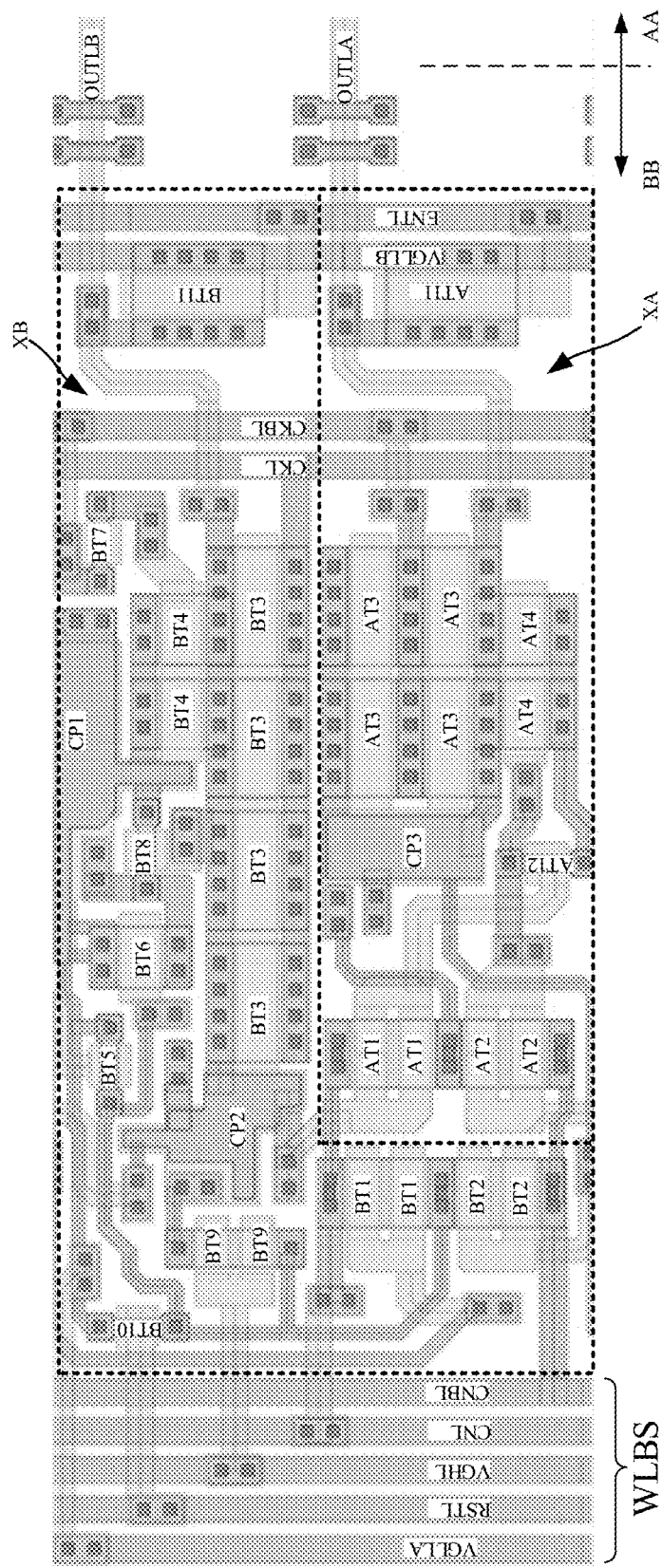
FIG. 8 is a schematic diagram of a stacked structure of a semiconductor layer, a gate layer, and a source-drain metal layer in an implementation of the present disclosure.

Further, referring to FIG. 8, in the first shift register unit GOAA, the second shift register unit GOAB is electrically connected to each driving line in the outer line group WLBS through an interconnection line. In this way, even if signal fluctuations are caused by overlapping lines, such signal fluctuations can be suppressed or tolerated by the second shift register unit GOAB which has more functions. Thus, this arrangement can make full use of characteristic of the second shift register unit GOAB which has more functions and better performance by setting more transistors, and the second shift register unit GOAB can also be used as a buffer to a certain extent to improve the stability of the signal transmitted to the first shift register unit GOAA, alleviating the problem of insufficient performance due to relatively small number of transistors in the first shift register unit GOAA.

In one example, referring to FIG. 8, the outer line group WLBS includes a first low-level signal line VGLLA, a reset control line RSTL, a first scan control line CNL, and a second scan control line CNBL which extend along the column direction DV. A first shift register unit GOAA and a second shift register unit GOAB, which are respectively located in two different shift register unit groups GOAS and are adjacent to each other, are electrically connected to the same first low-level signal line VGLLA. The reset control line RSTL is used to provide a reset control signal Rst to the shift register unit groups GOAS. The first scan control line CNL is used to provide a first scan control signal CN to the shift register unit groups GOAS. The second scan control line CNBL is used to provide a second scan control signal CNB to the shift register unit groups GOAS. One of the first scan control signal CN and the second scan control signal CNB is an inverted signal of the other one of the first scan control signal CN and the second scan control signal CNB.

In one example, referring to FIG. 8, the first shift register unit GOAA includes a first input transistor AT1 and a second input transistor AT2. The second shift register unit GOAB includes a first input transistor BT1 and a second input transistor BT2. The first input transistor BT1 is located between the first input transistor AT1 and the outer line group WLBS, and is arranged along the row direction DH. The second input transistor BT2 is located in the second input transistor AT2 and the outer line group WLBS, and is arranged along the row direction DH. A source AT1S of the first input transistor and a source BT1S of the first input transistor are electrically connected to the first scan control line CNL through the same conductive structure. A source AT2S of the second input transistor and a source BT2S of the second input transistor are electrically connected to the second scan control line CNBL through the same conductive structure. In this way, the wiring of the shift register unit groups GOAS can be simplified, and the compactness of transistor arrangement in the shift register unit groups GOAS can be improved. On the other hand, when the gate driving circuit GDC is working, by controlling the second scan control signal CNB applied on the second scan control line CNBL and the first scan control signal CN applied on the first scan control line CNL, the gate driving circuit GDC can realize different working modes such as forward scan and reverse scan. In other words, in this example, although the first shift register unit GOAA has a smaller number of transistors, it can still be cascaded with the first shift register unit GOAA to implement forward scan mode and reverse scan mode. This can make the functions of the gate driving circuit GDC more perfect.

In embodiments of the present disclosure, the numerals beginning with AT are used to represent transistors or a source, a gate, a drain, or a channel region of a transistor in the first shift register unit GOAA, so as to be distinguished from numerals of transistors in the second shift register unit GOAB.

In an implementation of the present disclosure, the first shift register unit GOAA includes:

a first input transistor AT1; where a source AT1S of the first input transistor is used to be applied with the first scan control signal CN, a drain AT1D of the first input transistor is electrically connected to a pull-up node APU (meanwhile serving as a pull-up control node), and a gate AT1G of the first input transistor is used to be electrically connected to an output terminal of a preceding-stage shift register unit GOA;

a second input transistor AT2; where a source AT2S of the second input transistor is used to be applied with the second scan control signal CNB, a drain AT2D of the second input transistor is electrically connected to the pull-up node APU, and a gate AT2G of the second input transistor is electrically connected to a pull-down node APD and is used to be electrically connected to an output terminal of a next-stage shift register unit GOA; one of the first scan control signal CN and the second scan control signal CNB is an inverted signal of the other one of the first scan control signal CN and the second scan control signal CNB;

a third capacitor C3 having a first electrode plate CP5 of the third capacitor and a second electrode plate CP6 of the third capacitor; where the second electrode plate CP6 of the third capacitor is electrically connected to the pull-up node APU, and the first electrode plate CP5 of the third capacitor is electrically connected to an output terminal of the first shift register unit GOAA;

a first output transistor AT3; where a drain AT3D of the first output transistor is electrically connected to the first electrode plate CP5 of the third capacitor, a gate AT3G of the first output transistor is electrically connected to the pull-up node APU, and one of a source AT3S of the first output transistor of the first shift register unit GOAA and a source BT3S of a first output transistor of an adjacent shift register unit GOA is used to be applied with a first clock signal CK, and the other one of the source AT3S of the first output transistor of the first shift register unit GOAA and the source BT3S of the first output transistor of the adjacent shift register unit GOA is used to be applied with a second clock signal CKB; one of the first clock signal CK and the second clock signal CKB is an inverted signal of the other one of the first clock signal CK and the second clock signal CKB;

a second output transistor AT4; where a source AT4S of the second output transistor is used to be applied with a low-level signal VGL, a drain AT4D of the second output transistor is electrically connected to the first electrode plate CP5 of the third capacitor, and a gate AT4G of the second output transistor is electrically connected to the pull-down node APD; and a pull-down control transistor AT12; where a source AT12S of the pull-down control transistor is used to be applied with the low-level signal VGL, a drain AT12D of the pull-down control transistor is electrically connected to the pull-down node APD, and a gate AT12G of the pull-down control transistor is electrically connected to the gate AT1G of the first input transistor.

In the first shift register unit GOAA, the first input transistor AT1 and the second input transistor AT2 may be used as an input module for receiving an output of the preceding-stage shift register unit GOA and an output of a next-stage shift register unit GOA, and realize the forward scan mode and the reverse scan mode through the first scan control signal CN and the second scan control signal CNB. In this example, the pull-down control transistor AT12 may be electrically connected to the output of the preceding-stage shift register unit GOA, and can thus regulate the voltage of the pull-down node APD under the control of the voltage of the output terminal of the preceding-stage shift register unit GOA, thereby avoiding possible instability caused by the floating of the pull-down node APD.

In an implementation of the present disclosure, referring to FIG. 8, the first input transistor AT1 includes two sub-transistors connected in series, and the two sub-transistors have a common gate. The second input transistor AT2 includes two sub-transistors connected in series, and the two sub-transistors have a common gate. Since the source and drain of each of the first input transistor AT1 and the second input transistor AT2 may maintain a large voltage difference for a long time, which is not conducive to the tolerance of the first input transistor AT1 and the second input transistor AT2, the embodiment of the present disclosure uses the first input transistor AT1 and the second input transistor AT2 each of which includes two sub-transistors connected in series, the two sub-transistors are used as voltage dividers so as to reduce the voltage difference between the source and drain of each sub-transistor, and improve the tolerance of the first input transistor A1 and the second input transistor AT2. For example, when the voltage difference across the first input transistor AT1 is 16V, by the voltage division of the two sub-transistors, the voltage at the junction of the two sub-transistors may be 9V, so that the source-drain voltage difference of one sub-transistor is 7V, and the source-drain voltage difference of another sub-transistor is 9V, thereby reducing the source-drain voltage difference and reducing the risk that the first input transistor AT1 is broken down.

In an implementation of the present disclosure, the size of each sub-transistor in the first input transistor AT1 and the second input transistor AT2 is the same. For example, the channel region width of each sub-transistor is 15.7 microns, and the channel region length of each sub-transistor is 5 microns.

In an implementation of the present disclosure, the first output transistor AT3A may have a large aspect ratio (width to length ratio), so as to improve the driving capability of the first output transistor AT3. Further, the first output transistor AT3 may be divided into multiple sub-transistors connected in parallel, so as to facilitate the preparation and arrangement of the first output transistor AT3. For example, referring to FIG. 8, the first output transistor AT3 may be divided into four sub-transistors, and the four sub-transistors are divided into two groups. The two groups of sub-transistors have a common source, and the drains of the two groups of sub-transistors are electrically connected to be electrically connected with the first output line OUTLA.

As an example, the total length of the first output transistor AT3A is 108 microns, and the width of the first output transistor AT3A is 7 microns.

In an implementation of the present disclosure, the second output transistor AT4A may also have a slightly large aspect ratio, and the aspect ratio of the second output transistor AT4A is smaller than that of the first output transistor AT3A. For example, the total length of the second output transistor AT4A is 32 microns, and the width of the second output transistor AT4A is 7 microns. Further, the second output transistor AT4 may be divided into multiple sub-transistors connected in parallel, so as to facilitate the preparation and arrangement of the second output transistor AT4. For example, referring to FIG. 8, the second output transistor AT4 may be divided into two sub-transistors.

In an example, two sub-transistors of the second output transistor AT4 and two of sub-transistors of the first output transistor AT3 may be arranged as sharing a common drain and being electrically connected to the first output line OUTLA. In this way, the compactness of the wiring of the first shift register unit GOAA can be improved.

In an implementation of the present disclosure, the first shift register unit GOAA further includes:
a touch control transistor AT11; where a source AT11S of the touch control transistor is used to be applied with the low-level signal VGL, a drain AT11D of the touch control transistor is electrically connected to the first electrode plate CP5 of the third capacitor, a gate AT11G of the touch control transistor is used to be applied with a touch control signal ENT. When the display panel PNL performs touch control, the touch control signal ENT is applied to the gate AT11G of the touch control transistor to turn on the gate AT11G of the touch control transistor, so that the first output line OUTLA does not output the scan signal.

Further, referring to FIG. 2 and FIG. 8, the inner line group WLAS includes a touch control line ENTL for applying the touch control signal ENT, and the gate AT11G of the touch control transistor is electrically connected to the touch control line ENTL.

In the embodiments of the present disclosure, numerals beginning with BT are used to represent transistors or a source, a gate, a drain, or a channel region of a transistor in the second shift register unit GOAB, so as to be distinguished from the numerals of the transistors in the first shift register unit GOAA.

In an implementation of the present disclosure, the second shift register unit GOAB includes:
a first input transistor BT1; where a source BT1S of the first input transistor is used to be applied with the first scan control signal CN, a drain BT1D of the first input transistor is used to be electrically connected to a pull-up control node BPUCN, and a gate BT1G of the first input transistor is used to be electrically connected to an output terminal of a preceding-stage shift register unit GOA;
a second input transistor BT2; where a source BT2S of the second input transistor is used to be applied with the second scan control signal CNB, a drain BT2D of the second input transistor is used to be electrically connected to the pull-up control node BPUCN, and a gate BT2G of the second input transistor is used to be electrically connected to an output terminal of a next-stage shift register unit GOA; one of the first scan control signal CN and the second scan control signal CNB is an inverted signal of the other one of the first scan control signal CN and the second scan control signal CNB;
a first capacitor C1 including a first electrode plate CP1 of the first capacitor and a second electrode plate CP2 of the first capacitor; where the first electrode plate CP1 of the first capacitor is electrically connected to an output terminal of the second shift register unit GOAB, and the second electrode plate CP2 of the first capacitor is electrically connected to a pull-up node BPU;
a second capacitor C2 including a first electrode plate CP3 of the second capacitor and a second electrode plate CP4 of the second capacitor; where the first electrode plate CP3 of the second capacitor is electrically connected to a pull-down node BPD, and the second electrode plate CP4 of the second capacitor is used to be applied with the low-level signal VGL;
a first output transistor BT3; where a drain BT3D of the first output transistor is electrically connected to the pull-up node BPU, a drain BT3D of the first output transistor is electrically connected to the first electrode plate CP1 of the first capacitor, and one of a source BT3S of the first output transistor of the second shift register unit GOAB and a source BT3S of a first output transistor of an adjacent shift register unit GOA is used to be applied with a first clock signal CK, and the other one of the source BT3S of the first output transistor of the second shift register unit GOAB and the source BT3S of the first output transistor of the adjacent shift register unit GOA is used to be applied with a second clock signal CKB; one of the first clock signal CK and the second clock signal CKB is an inverted signal of the other one of the first clock signal CK and the second clock signal CKB;

a second output transistor BT4; where a source BT4S of the second output transistor is used to be applied with the low-level signal VGL, a drain BT4D of the second output transistor is electrically connected to the first electrode plate CP1 of the first capacitor, and a gate BT4G of the second output transistor is electrically connected to the pull-down node BPD;

a first pull-down transistor BT5; where a source BT5S of the first pull-down transistor is used to be applied with the low-level signal VGL, a drain BT5D of the first pull-down transistor is electrically connected to the pull-up control node BPUCN, and a gate BT5G of the first pull-down transistor is electrically connected to the pull-down node BPD;

a first pull-down control transistor BT6; where a source BT6S of the first pull-down control transistor is used to be applied with the low-level signal VGL, a drain BT6D of the first pull-down control transistor is electrically connected to the pull-down node BPD, and a gate BT6G of the first pull-down control transistor is electrically connected to the pull-up control node BPUCN;

a second pull-down control transistor BT7; where a drain BT7D of the second pull-down control transistor is electrically connected to the pull-down node BPD, a gate BT7G of the second pull-down control transistor is electrically connected to a source BT7S of the second pull-down control transistor, and one of the source BT7S of the second pull-down control transistor and the source BT3S of the first output transistor is used to be applied with the first clock signal CK and the other one of the source BT7S of the second pull-down control transistor and the source BT3S of the first output transistor is used to be applied with the second clock signal CKB;

a second pull-down transistor BT8; where a source BT8S of the second pull-down transistor is used to be applied with the low-level signal VGL, a drain BT8D of the second pull-down transistor is electrically connected to the pull-down node BPD, and a gate BT8G of the second pull-down transistor is electrically connected to the first electrode plate CP1 of the first capacitor; and a reset transistor BT10; where a source BT10S of the reset transistor is used to be applied with the low-level signal VGL, a drain BT10D of the reset transistor is electrically connected to the pull-up control node BPUCN, and a gate BT10G of the reset transistor is used to be applied with a reset control signal Rst;

the pull-up control node BPUCN is electrically connected to the pull-up node BPU.

In the second shift register unit GOAB, the first input transistor BT1 and the second input transistor BT2 may be used as an input module for receiving an output of the preceding-stage shift register unit GOA and an output of the next-stage shift register unit GOA, and realize the forward scan mode and the reverse scan mode through the first scan control signal CN and the second scan control signal CNB. In this example, the second pull-down control transistor BT7 is used to control the pull-down node BPD in response to the second clock signal CKB, so as to periodically control the conduction of the first pull-down transistor BT5 through the voltage of the pull-down node BPD, thus realizing the periodic pulling down of the pull-up control node BPUCN. And, the second output transistor BT4 is kept turned on by the high-level signal of the pull-down node BPD, so that the second shift register unit GOAB outputs a low-level signal. When the input module pulls up the pull-up control node BPUCN, the first pull-down control transistor BT6 can pull down the pull-down node BPD, and accordingly the first pull-down transistor BT5 and the second output transistor BT4 are turned off, so that the voltage of the pull-up control node BPUCN is maintained, and thus the voltage of the pull-up node BPU is maintained at a high-level, and the first output transistor BT3 is turned on to output the scan signal. When the first output transistor BT3 is turned on to output the scan signal, the second pull-down transistor BT8 can be turned on to pull down the pull-down node BPD, so that the pull-down node BPD maintains at a low-level, the pull-up control node BPUCN maintains at a high-level, the pull-up node BPU maintains at a high-level, and the first output transistor BT3 is turned on to output a scan signal until the first clock signal CK becomes a low-level signal.

Figure 4:
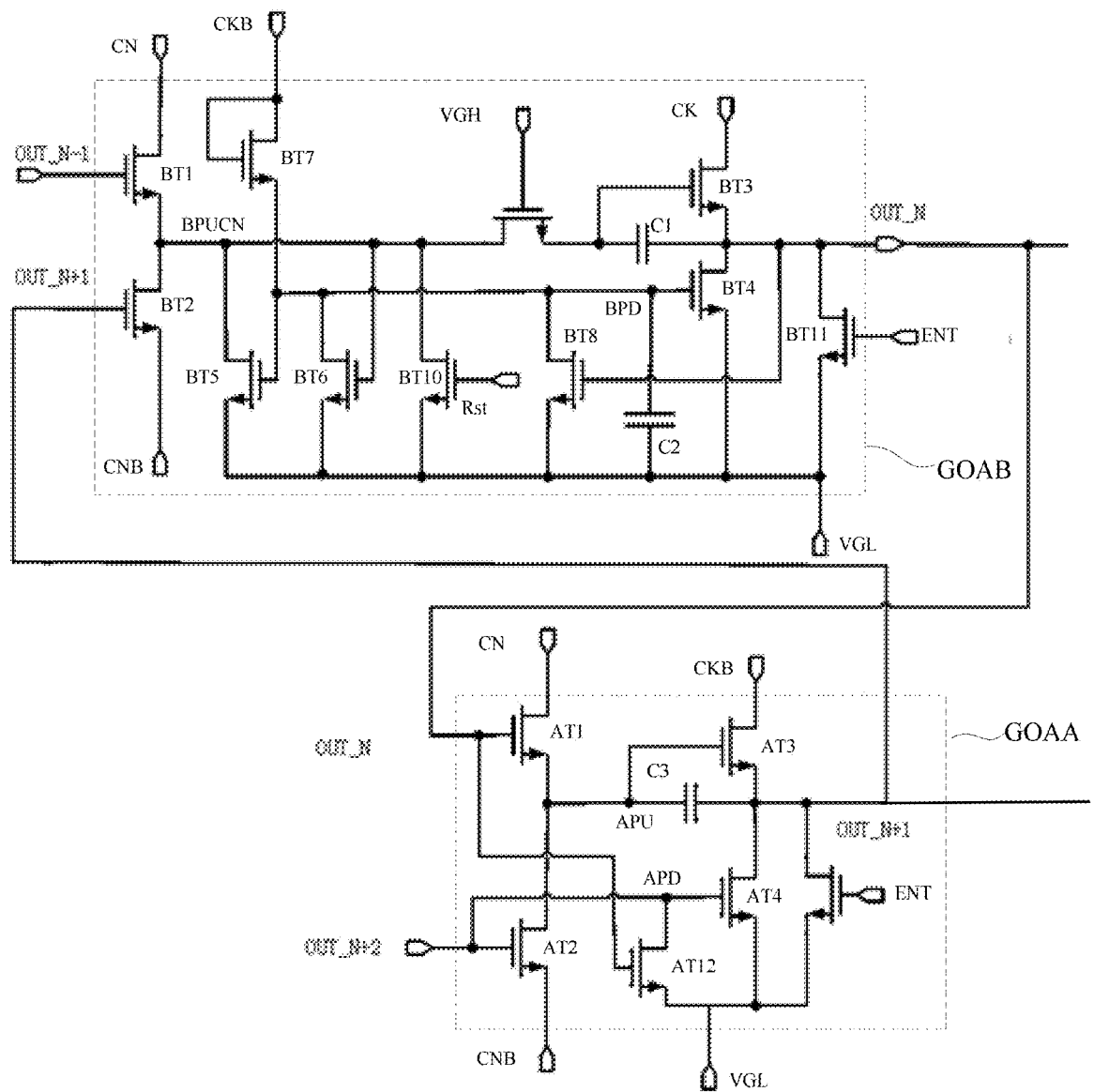
FIG. 4 is a schematic structural diagram of a shift register unit in an implementation of the present disclosure.

In one example, referring to FIG. 4, the second shift register unit GOAB further includes an enable transistor BT9 and a touch control transistor BT11. The pull-up control node BPUCN and the pull-up node BPU are electrically connected through the enable transistor BT9.

A source BT9S of the enable transistor is electrically connected to the pull-up control node BPUCN, a drain BT9D of the enable transistor is electrically connected to the pull-up node BPU, and a gate BT9G of the enable transistor is used to be applied with a high-level signal VGH. A source BT11S of the touch control transistor is electrically connected to the low-level signal VGL, a drain BT11D of the touch control transistor is electrically connected to the first electrode plate CP1 of the first capacitor, and a gate BT11G of the touch control transistor is used to be applied with the touch control signal ENT. One of the touch control signal ENT and the high-level signal VGH is an inverted signal of the other one of the touch control signal ENT and the high-level signal VGH.

In this way, when the display panel PNL performs touch control, a high-level touch control signal ENT can be applied to the gate BT11G of the touch control transistor through the touch control line ENTL, thereby turning on the touch control transistor BT11, which makes the output of the second shift register unit GOAB be a low-level signal. Correspondingly, the high-level signal VGH becomes a level signal, thereby turning off the enable transistor BT9, and accordingly preventing the first output transistor BT3 from being turned on.

In one example, referring to FIG. 8, the first input transistor BT1 includes two sub-transistors connected in series, and the two sub-transistors have a common gate; the second input transistor BT2 includes two sub-transistors connected in series, and the two sub-transistors have a common gate. Since the source and drain of each of the first input transistor BT1 and the second input transistor BT2 may maintain a large voltage difference for a long time, which is not conducive to the tolerance of the first input transistor BT1 and the second input transistor BT2, the embodiment of the present disclosure uses the first input transistor BT1 and the second input transistor BT2 each of which includes two sub-transistors connected in series, the two sub-transistors can perform voltage division to reduce the voltage difference between the source and drain of each sub-transistor, and improve the tolerance of the first input transistor BT1 and the second input transistor BT2. Further, the threshold offset tolerance of the first input transistor BT1 and the second input transistor BT2 can reach 6V.

In one example, the size of the first input transistor BT1A of the second shift register unit GOAB is the same as the size of the first input transistor AT1A of the first shift register unit GOAA; the size of the second input transistor BT2A of the second shift register unit GOAB is the same as the size of the second input transistor AT2A of the first shift register unit GOAA.

In an example, referring to FIG. 8, the first output transistor BT3A may have a large aspect ratio to improve the driving capability of the first output transistor BT3. Further, the first output transistor BT3 may be divided into multiple sub-transistors connected in parallel, so as to facilitate the preparation and arrangement of the first output transistor BT3. For example, referring to FIG. 8, the first output transistor BT3 may be divided into four parallel sub-transistors, and the four sub-transistors are arranged in sequence along the row direction.

In one example, the size of the first output transistor BT3A of the second shift register unit GOAB is the same as the size of the first output transistor AT3A of the first shift register unit GOAA.

In an implementation of the present disclosure, the second output transistor BT4A may also have a slightly large aspect ratio, and the aspect ratio of the second output transistor BT4A is smaller than the aspect ratio of the first output transistor BT3A. Further, the second output transistor BT4 may be divided into multiple sub-transistors connected in parallel, so as to facilitate the preparation and arrangement of the second output transistor BT4. For example, referring to FIG. 8, the second output transistor BT4 may be divided into two sub-transistors.

In one example, the size of the second output transistor BT4A of the second shift register unit GOAB is the same as the size of the second output transistor AT4A of the first shift register unit GOAA.

In the above gate driving circuit GDC provided by example embodiments of the present disclosure, although the number of transistors in the first shift register unit GOAA and the second shift register unit GOAB are not the same, they both similarly have an input module (the first input transistor AT1 and the second input transistor AT2 in the first shift register unit GOAA, and the first input transistor BT1 and the second input transistor BT2 in the second shift register unit GOAB) and an output module (the first output transistor AT3 and the second output transistor AT4 in the first shift register unit GOAA, and the first output transistor BT3 and the second output transistor BT4 in the second shift register unit GOAB), and correspondingly have a capacitor electrically connected to a pull-up node (for example, the third capacitor C3 electrically connected to the pull-up node APU in the first shift register unit GOAA, and the first capacitor C1 electrically connected to the pull-up node BPU in the second shift register unit GOAB), and both are provided with a pull-down node (for example, the pull-down node APD in the first shift register unit GOAA and the pull-down node BPD in the second shift register unit GOAB). Therefore, both the first shift register unit GOAA and the second shift register unit GOAB can realize signal input through the input module, so that the cascaded shift register units GOA can output scan signals stage by stage. Both the first shift register unit GOAA and the second shift register unit GOAB can realize pull-up in response to the voltage of the pull-up node, and output a high-level scan signal. Both the first shift register unit GOAA and the second shift register unit GOAB can realize pull-up in response to the pull-down voltage, and output a low-level signal. Correspondingly, the second shift register unit GOAB is provided with other transistors that improve the performance and functions of the second shift register unit GOAB (such as, the second pull-down control transistor BT7, the first pull-down transistor BT5, the first pull-down control transistor BT6, the second pull-down transistor BT8 and the reset transistor BT10 in the second shift register unit GOAB), these transistors in the second shift register unit GOAB can make the performance of the second shift register unit GOAB stable, and can also make the pull-down node APD of the first shift register unit GOAA remain stable by applying a signal to the first input transistor BT12 of the first shift register unit GOAA, avoiding floating of the pull-down node APD, which enables the first shift register unit GOAA to rely on the stability of the second shift register unit GOAB to keep the performance stable. Meanwhile, in the example gate driving circuit GDC, the first shift register unit GOAA and the second shift register unit GOAB are provided with basically same input modules, this can make the first shift register unit GOAA and the second shift register unit GOAB have similar or the same driving capability. Through the control on the pull-down node APD of the first shift register unit GOAA by the output terminal of the second shift register unit GOAB, the first shift register unit GOAA and the second shift register unit GOAB may have basically the same response speed.

Figure 9:
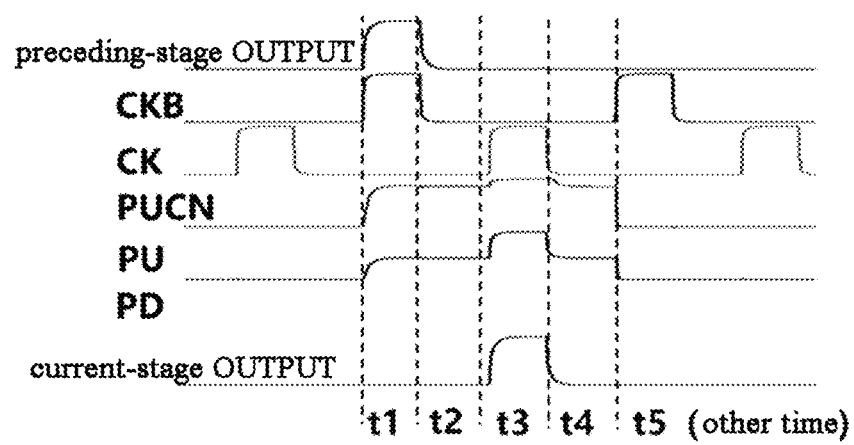
FIG. 9 is a schematic diagram of timing between shift register units of two adjacent stages in an implementation of the present disclosure.

FIG. 9 illustrates driving timing between two adjacent shift register units GOA, and the working mode is a forward scan mode. A shift register unit GOA of a stage is a first shift register unit GOAA, and a shift register unit GOA of another stage is a second shift register unit GOAB. In this example, a source and a gate of a first output transistor of a preceding-stage shift register unit GOA are used to be applied with a second clock signal CKB, and a source and gate of a first output transistor of a current-stage shift register unit GOA are used to be applied with a first clock signal CK.

Referring to FIG. 9, at a first time moment t1, the second clock signal CKB is a high-level signal and the first clock signal CK is a low-level signal, and at this time, the preceding-stage shift register unit GOA outputs a high-level scan signal. This makes the first scan control signal PUCN of the current-stage shift register unit GOA start to be pulled up, and thus the PU starts to be pulled up, and the pull-down node is pulled down. The current-stage shift register unit GOA outputs a low-level signal. At a second time moment t2, the second clock signal CKB becomes a low-level signal, and the voltage output by the preceding-stage shift register unit GOA becomes a low-level signal, and thus the voltage of each node of the current-stage shift register unit GOA and the output voltage are not influenced. At a third time moment t3, the first clock signal CK becomes a high-level signal; at this time, the current-stage shift register unit GOA may output the high-level signal of the first clock signal CK, so that the current-stage shift register unit GOA outputs a high-level scan signal. Under the coupling effect, the voltages of the pull-up node and the pull-up control node are pulled up, further making the shift register unit GOA keep outputting a high-level scan signal. At a fourth time moment t4, the first clock signal CK becomes a low-level signal, thereby causing the voltage at the output terminal of the current-stage shift register unit GOA to drop, and through the coupling effect, the voltages of the pull-down node and the pull-down control node drop, and at this time, the output terminal of the shift register unit GOA is a low-level signal. At a fifth time moment t5, the next-stage shift register unit GOA outputs a high-level signal, thereby causing the second input transistor of the current-stage shift register unit GOA to be applied with a low-level signal to the pull-up node, and accordingly making the pull-up node of the current-stage shift register unit GOA be a low-level signal. In this way, the preceding-stage shift register unit GOA, the current-stage shift register unit GOA, and the next-stage shift register unit GOA sequentially output high-level scan signals. Such sequential outputs are not related to whether the shift register units GOA are first shift register units GOAA or second shift register units GOAB.

Therefore, the gate driving circuit GDC in the above examples of the present disclosure can reduce the number of transistors of the gate driving circuit GDC while ensuring the stable performance and complete functions of the gate driving circuit GDC, thereby reducing the bezel of the display panel PNL. It can be understood that, the gate driving circuit GDC of the above-mentioned examples in the present disclosure, especially the example structures of the first shift register unit GOAA and the second shift register unit GOAB in FIG. 4, is only an example of the disclosed gate driving circuit GDC. In order to achieve the same purpose and meet the needs of the display panel PNL, the gate driving circuit GDC may also adopt a first shift register unit GOAA of other structure(s) and a second shift register unit GOAB of other structure(s).

In some implementations of the present disclosure, referring to FIG. 1, the display panel PNL includes two gate driving circuits, and the two gate driving circuits are respectively located on both sides of the display area AA. Pixel driving circuits PDC in any one row are simultaneously driven by the two gate driving circuits. In other words, in the display panel PNL of the present disclosure, gate driving circuits GDC may be respectively provided on both sides of the display area AA, and each row of pixel drive circuits PDC are simultaneously driven by the two gate driving circuits GDC. In this way, the driving capability for driving the pixel driving circuits PDC in each row can be improved, thereby increasing the charging rate of the pixel driving circuits PDC, which overcomes possible insufficient charging capability of a single gate driving circuit GDC. Especially in a large-sized display panel PNL, this can significantly increase the charging rate of the pixel driving circuits PDC; in some implementations, the charging rate of the pixel driving circuits PDC can be increased by 2.37% or more.

In related art, the way of setting the gate driving circuits GDC respectively on both sides of the display panel PNL will result in a larger bezel of a display panel PNL; however, in the present disclosure, the width of each gate driving circuit GDC is smaller, which can be more effectively reduce the bezel of the display panel PNL, so that the gate driving circuit GDC is especially suitable for a display panel PNL with double gate driving circuits GDC.

In an implementation of the present disclosure, the pixel driving circuits PDC in any one row are driven by a first shift register unit GOAA of one gate driving circuit, and are driven by a second shift register unit GOAB of the other gate driving circuit. In other words, two shift register units GOA are respectively connected to two ends of a scan line GL, and the two shift register units GOA are respectively a first shift register unit GOAA and a second shift register unit GOAB. In this way, the first shift register unit GOAA and the second shift register unit GOAB connected to the same scan line GL respectively belong to different gate driving circuits GDC, but they can cooperate with each other through the connected scan line GL to achieve joint driving for the pixel driving circuits PDC connected to the scan line GL. In this way, the first shift register unit GOAA can not only obtain the functional support of an adjacent second shift register unit GOAB in the same gate driving circuit GDC to maintain stability and maintain good performance, but also a second shift register unit GOAB connected to the same scan line GL can provide an influence on its output terminal, avoiding the influence of the first shift register unit GOAA on a second shift register unit GOAB of the next stage due to possible fluctuations or slow response.

On the other hand, referring to FIG. 1, the two gate driving circuits GDC are connected through scan lines GL, and each scan line GL is connected to a second shift register unit GOAB, which is equivalent, to a certain extent, to that the second shift register units GOAB are sequentially cascaded across the display area AA, so as to maintain the high performance of the gate driving circuits GDC. The first shift register unit GOAA acts as a compensation circuit to drive the scan line GL, and the first shift register unit GOAA cooperates with the second shift register unit GOAB which is connected to the same scan line GL to improve the driving capability for driving the pixel driving circuits PDC on the scan line GL.

The structure, principle and implementation of the gate driving circuit GDC of the present disclosure will be further described in conjunction with a specific example as follows. In the example gate driving circuit GDC, the equivalent circuits of the first shift register unit GOAA and the second shift register unit GOAB are shown in FIG. 4.

In this example, the display panel PNL includes a base substrate BP, a semiconductor layer SEMI, a gate layer GT, and a semiconductor layer SD that are sequentially stacked. A gate insulating layer is arranged between the semiconductor layer SEMI and the gate layer GT. An interlayer dielectric layer is arranged between the gate layer GT and the semiconductor layer SD.

Figure 5:
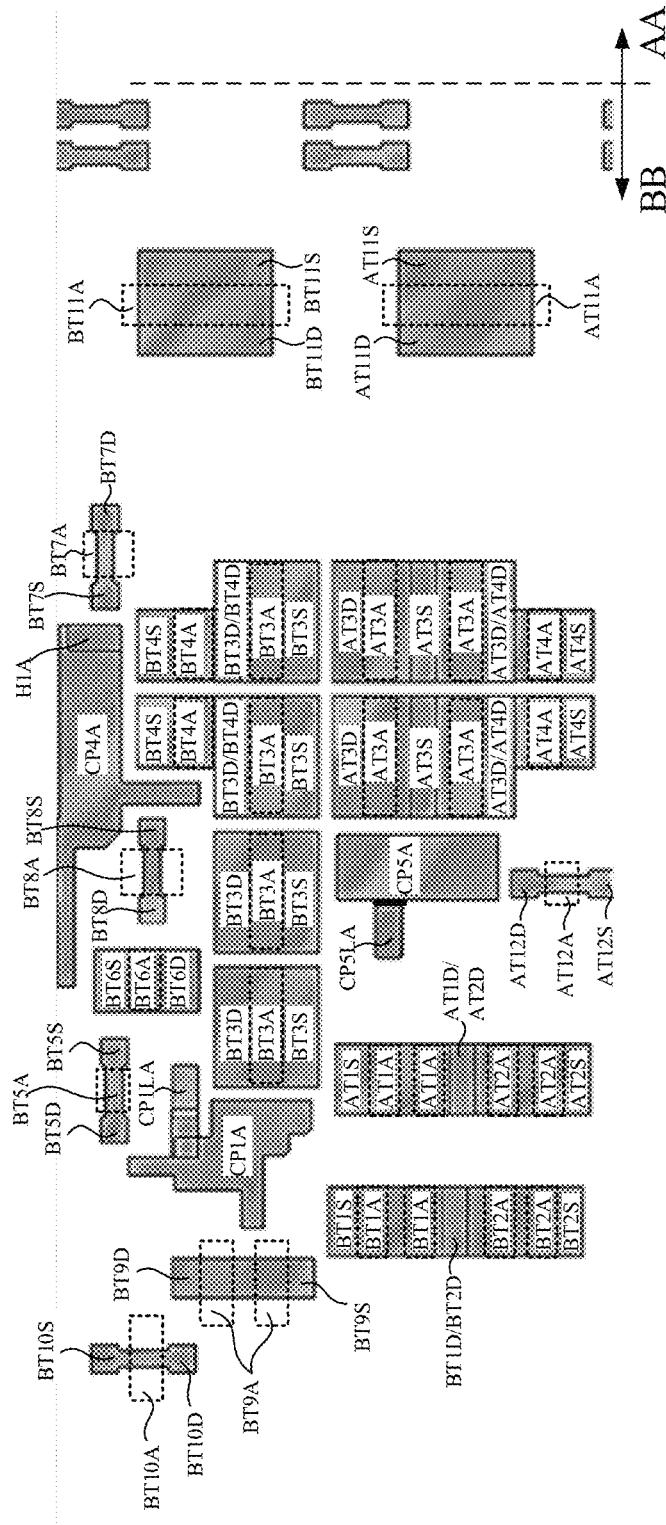
FIG. 5 is a schematic structural diagram of a semiconductor layer in an implementation of the present disclosure.

Referring to FIG. 5 and FIG. 8, in a first circuit area XA and a second circuit area XB corresponding to a shift register unit group GOAS, the semiconductor layer SEMI may include a channel region of each transistor of the shift register unit GOA, and include a source of the transistor and a drain of the transistor located on either side of the channel region. The semiconductor layer SEMI may also be provided with electrode plates of some capacitor to increase the capacity of the capacitors or reduce the areas of the capacitors. The channel region of each transistor may maintain semiconductor characteristics, specifically, may maintain N-type semiconductor characteristics, so that each transistor is an N-type transistor. The source of each transistor and the drain of each transistor, and the electrode plates can be conductorized.

Referring to FIG. 5 and FIG. 8, both the first circuit area XA and the second circuit area XB are arranged close to the display area AA. There is a protruding area in the second circuit area XB, and the protruding area is located on a side of the first circuit area XA away from the display area AA. In this way, the width of the second circuit area XB can be reduced, thereby reducing the width of the gate driving circuit GDC. In the protruding area of the second circuit area XB, the first input transistor BT1 and the second input transistor BT2 of the second shift register unit GOAB are arranged. On a side of the first circuit area XA away from the display area AA, the first input transistor AT1 and the second input transistor AT2 of the shift register unit GOA are arranged.

The electrode plates arranged in the semiconductor layer SEMI include a fourth bottom electrode plate CP4A, a first bottom electrode plate CP1A, and a fifth top electrode plate CP5A. In the fourth bottom electrode plate CP4A, there is a first bottom via hole area H1A for connection with a fourth top electrode plate CP4B through a via hole. The first bottom electrode plate CP1A has a first electrode plate CP1LA of the first capacitor for connection with the first top electrode plate CP1B through a via hole. The fifth top electrode plate CP5A has a first protrusion CP5LA of the fifth electrode plate for connection with a fifth bottom electrode plate CP5B through a via hole.

Some transistors can be set with a common drain. For example, a part of the drain BT3D of the first output transistor may be reused as the drain BT4D of the second output transistor; a part of the drain AT3D of the first output transistor may be reused as the drain AT4D of the second output transistor; the drain BT1D of the first input transistor and the drain BT2D of the second input transistor are reused with each other, and the drain AT1D of the first input transistor and the drain AT2D of the second input transistor are reused with each other.

Figure 6:
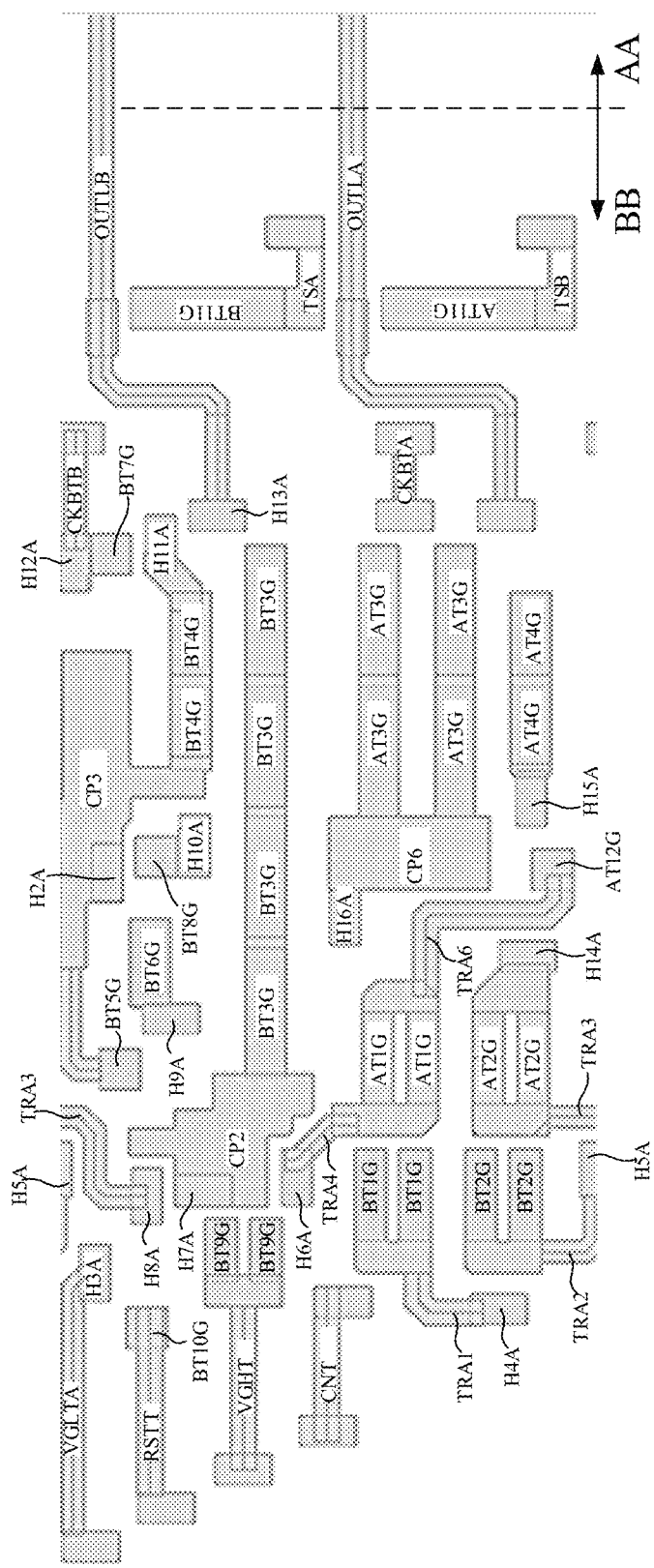
FIG. 6 is a schematic structural diagram of a gate layer in an implementation of the present disclosure.
Figure 7:
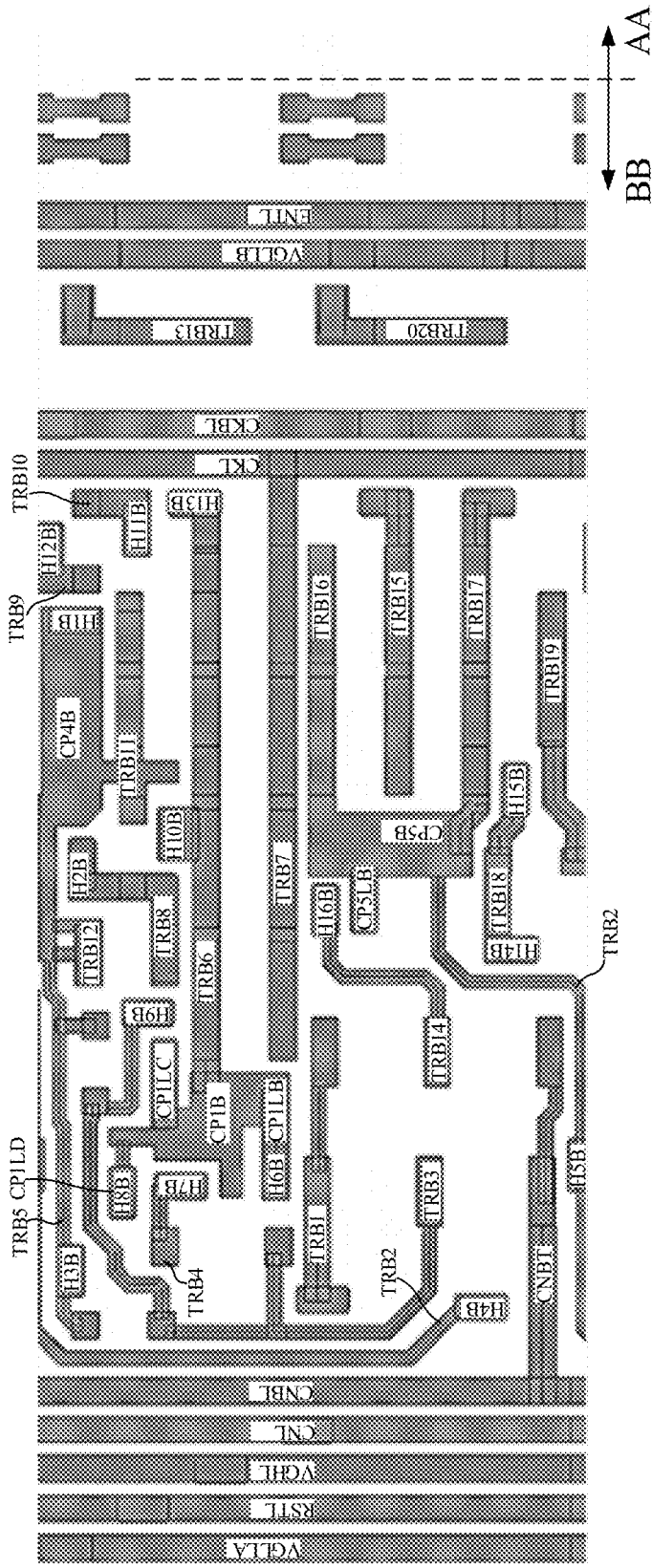
FIG. 7 is a schematic structural diagram of a source-drain metal layer in an implementation of the present disclosure.

Referring to FIG. 6 and FIG. 8, the gate layer GT is provided with gates of respective transistors, and is further provided with electrode plates of capacitor(s) and some interconnection lines. Referring to FIG. 7 and FIG. 8, the semiconductor layer SD is provided with driving lines, electrode plates and some interconnection lines.

Referring to FIG. 7, the driving lines include a first low-level signal line VGLLA, a reset control line RSTL, a high-level line VGHL, a first scan control line CNL and a second scan control line CNBL which are located on a side of the first circuit area XA and the second circuit area XB away from the display area AA. The first low-level signal line VGLLA is used to be applied with the low-level signal VGL. The reset control line RSTL is used to be applied with the reset control signal Rst. The high-level line VGHL is used to be applied with the high-level signal VGH. The first scan control line CNL is used to be applied with the first scan control signal CN. The second scan control line CNBL is used to be applied with the second scan control signal CNB. The driving lines also include a first clock line CKL, a second clock line CKBL, a second low-level interconnection line VGLLB, and a touch control line ENTL which are located on a side of the first circuit area XA and the second circuit area XB close to the display area AA. The first clock line CKL is used to be applied with the first clock signal CK. The second clock line CKBL is used to be applied with the second clock signal CKB. The second low-level interconnection line VGLLB is used to be applied with the low-level signal VGL. The touch control line ENTL is used to be applied with the touch control signal ENT.

Referring to FIG. 5 to FIG. 8, the semiconductor layer SD is further provided with a fifth top interconnection line TRB5. The gate layer GT is provided with a first low-level interconnection line VGLTA. An end of the first low-level interconnection line VGLTA away from the display area AA is connected with the first low-level signal line VGLLA through a via hole, and an end of the first low-level interconnection line VGLTA close to the display area AA has a third bottom via hole area H3A. An end of the fifth top interconnection line TRB5 away from the display area AA is connected to the source BT10S of the reset transistor through a via hole, and an end of the fifth top interconnection line TRB5 close to the display area AA is connected to the fourth top electrode plate CP4B in the semiconductor layer SD. In the fifth top interconnection line TRB5, there is provided an expansion part having a third top via hole area H3B and a side branch part connected to the source BT5S of the first pull-down transistor through a via hole. The third top via hole area H3B is connected to the third bottom via hole area H3A through a via hole. An end of the fourth top electrode plate CP4B close to the fifth bottom interconnection line TRA5 is connected to a twelfth top interconnection line TRB12, and an end of the fourth top electrode plate CP4B close to the display area AA has a first top via hole area H1B, and a side of the fourth top electrode plate CP4B close to the first output transistor BT3 is connected to an eleventh top interconnection line TRB11. The twelfth top interconnection line TRB12 is electrically connected to the source BT6S of the first pull-down control transistor through a via hole, and the eleventh top interconnection line TRB11 is electrically connected to the source BT8S of the second pull-down transistor and the source BT4S of the second output transistor through via holes. In this way, in the second shift register unit GOAB, the low-level signal VGL can be applied to the source BT10S of the reset transistor, the source BT5S of the first pull-down transistor, the source BT6S of the first pull-down control transistor, the source BT8S of the second pull-down transistor and the source BT4S of the second output transistor, and the first electrode plate CP3 of the second capacitor. In the first circuit area XA, the semiconductor layer SD is provided with a nineteenth top interconnection line TRB19, and the nineteenth top interconnection line TRB19 is electrically connected to a fourth top electrode plate CP4B in an adjacent second circuit area XB, and the nineteenth interconnection line TRB19 is electrically connected to the source electrode AT12S of the pull-down control transistor and the source electrode AT4S of the second output transistor through via holes. In this way, the low-level signal VGL can also be applied to the source AT4S of the second output transistor and the source AT12S of the pull-down control transistor.

Referring to FIG. 5 to FIG. 8, the semiconductor layer SD is provided with a reset control line RSTL, and the gate layer GT is provided with a reset interconnection line RSTT. An end of the reset interconnection line RSTT away from the display area AA is electrically connected to the reset control line RSTL through a via hole, and an end of the reset interconnection line RSTT close to the display area AA is used as the gate BT10G of the reset transistor and overlaps the reset transistor BT10A.

Referring to FIG. 5 to FIG. 8, the semiconductor layer SD is provided with a high-level line VGHL, and the gate layer GT is provided with a high-level interconnection line VGHT. An end of the high-level interconnection line VGHT away from the display area AA is electrically connected to the high-level line VGHL through a via hole, and an end of the high-level interconnection line VGHT close to the display area AA is used as the gate BT9G of the enable transistor and overlaps the enable transistor BT9A.

Referring to FIGS. 5 to 8, the semiconductor layer SD is provided with a first scan control line CNL and a first top interconnection line TRB1, and the gate layer GT is provided with a first scan control interconnection line CNT. An end of the first scan control interconnection line CNT away from the display area AA is electrically connected to the first scan control line CNL through a via hole, and an end of the first scan control interconnection line CNT close to the display area AA is connected to an end of the first top interconnection line TRB1 away from the display area AA through a via hole. The first top interconnection line TRB1 extends toward a direction close to the display area AA, and is sequentially electrically connected to the source BT1S of the first input transistor and the source AT1S of the first input transistor through via holes.

Referring to FIGS. 5 to 8, the semiconductor layer SD is provided with a second scan control interconnection line CNBT electrically connected to the second scan control line CNBL, and the second scan control interconnection line CNBT extends to a side of the display area AA along the row direction DH, and is sequentially electrically connected to the source BT2S of the second input transistor and the source AT2S of the second input transistor through via holes.

Referring to FIG. 5 to FIG. 8, the semiconductor layer SD is further provided with a seventh top interconnection line TRB7, a ninth top interconnection line TRB9, and a fifteenth top interconnection line TRB15. The gate layer GT is provided with a first clock interconnection line CKBTA, and a second clock interconnection line CKBTB. An end of the first clock interconnection line CKBTA close to the display area AA is electrically connected to the second clock line CKBL through a via hole, and an end of the first clock interconnection line CKBTA away from the display area AA is connected to an end of the fifteenth top interconnection line TRB15 close to the display area AA through a via hole. The fifteenth interconnection line TRB15 is electrically connected to the source electrode AT3S of the first output transistor through a via hole. An end of the second clock interconnection line CKBTB close to the display area AA is electrically connected to the second clock line CKBL through a via hole, and an end of the second clock interconnection line CKBTB away from the display area AA is used as the gate BT7G of the second pull-down control transistor and overlaps the second pull-down control transistor BT7A. The second clock interconnection line CKBTB has a twelfth bottom via hole area H12A. The ninth top interconnection line TRB9 has a twelfth top via hole area H12B. The twelfth bottom via hole area H12A and the twelfth top via hole area H12B mutually overlap and are electrically connected through a via hole. In this way, an end of the ninth top interconnection line TRB9 is electrically connected to the second clock interconnection line CKBTB through a via hole, and the other end is electrically connected to the source BT7S of the second pull-down control transistor through a via hole. The seventh top interconnection line TRB7 is electrically connected to the first clock line CKL, extends toward a direction away from the display area AA, and is electrically connected to the source BT3S of the first output transistor through a via hole. In this way, the source BT7S of the second pull-down control transistor of the second shift register unit GOAB in this example can be applied with the second clock signal CKB, and the source AT3S of the first output transistor of the first shift register unit GOAA in this example can be applied with the second clock signal CKB, and the source BT3S of the first output transistor of the second shift register unit GOAB in this example can be applied with the first clock signal CK.

Referring to FIG. 5 to FIG. 8, the semiconductor layer SD is provided with a third top interconnection line TRB3. An end of the third top interconnection line TRB3 is electrically connected to the drain BT1D of the first input transistor through a via hole, and the other end has a ninth top via hole area H9B. The third top interconnection line TRB3 is provided with a side branch part electrically connected to the source BT9S of the enable transistor through a via hole, and can be electrically connected to the drain BT10D of the reset transistor and the drain BT5D of the first pull-down transistor through via holes. In the gate layer GT, the gate BT6G of the first pull-down control transistor has a protrusion, and the protrusion has a ninth bottom via hole area H9A, and the ninth bottom via hole area H9A and the ninth top via hole area H9B are electrically connected through a via hole. In this way, the drain BT1D of the first input transistor, as a part of the pull-up control node BPUCN, can be electrically connected with the source BT9S of the enable transistor, the drain BT10D of the reset transistor, the drain BT5D of the first pull-down transistor, and the gate BT6G of the first pull-down control transistor.

Referring to FIG. 5 to FIG. 8, the semiconductor layer SD is provided with a sixth top interconnection line TRB6, a first top electrode plate CP1B, and a fourth top interconnection line TRB4. The gate layer GT is provided with the second electrode plate CP2 of the first capacitor, the second output transistor BT3A and a second output line OUTLB. The second electrode plate CP2 of the first capacitor has a seventh bottom via hole area H7A, and is electrically connected to the gate BT3G of the first output transistor. An end of the fourth top interconnection line TRB4 is electrically connected to the drain BT9D of the enable transistor through a via hole, and the other end has a seventh top via hole area H7B. The seventh top via hole area H7B and the seventh bottom via hole area H7A are electrically connected through a via hole. The sixth top interconnection line TRB6 is electrically connected to the first top electrode plate CP1B, and is electrically connected to the drain BT3D of the first output transistor. An end of the sixth top interconnection line TRB6 close to the display area AA is provided with a thirteenth top via hole area H13B, and an end of the second output line OUTLB away from the display area AA has a thirteenth bottom via hole area H13A. The eleventh bottom via hole area H11A and the eleventh top via hole area H11B overlap each other and are electrically connected through a via hole. The sixth top interconnection line TRB6 has an enlarged part, and a tenth top via hole area H10B is arranged in the enlarged part. The gate BT8G of the second pull-down transistor has a protrusion, and a tenth bottom via hole area H10A is arranged in the protrusion. The tenth bottom via hole area H10A and the tenth top via hole area H10B overlap each other and are electrically connected through a via hole.

Further, the first bottom electrode plate CP1A has a first protrusion CL1LA of the first electrode plate, and the first top electrode plate CP1B has a third protrusion CP1LC of the first electrode plate. The third protrusion CP1LC of the first electrode plate and the first protrusion CL1LA of the first electrode plate overlap each other and are electrically connected through a via hole. The first top electrode plate CP1B has a second protrusion CP1LB of the first electrode plate, and the second protrusion CP1LB of the first electrode plate is provided with a sixth top via hole area H6B. The gate layer GT is provided with a fourth bottom interconnection line TRA4 connected to the gate AT1G of the first input transistor, and an end of the fourth bottom interconnection line TRA4 has a sixth bottom via hole area H6A. The sixth bottom via hole area H6A and the sixth top via hole area H6B overlap each other and are electrically connected through a via hole. The first top electrode plate CP1B has a fourth protrusion CP1LD of the first electrode plate, the second protrusion CP1LB of the first electrode plate is provided with an eighth top via hole area H8B. The gate layer GT is provided with a third bottom interconnection line TRA3. An end of the third bottom interconnection line TRA3 is connected to a gate AT2G of a second input transistor of a first shift register unit GOAA in a preceding stage, and the other end has an eighth bottom via hole area H8A. The eighth bottom via hole area H8A and the eighth top via hole area H8B overlap each other and are electrically connected through a via hole.

Referring to FIG. 5 to FIG. 8, the gate layer GT is provided with the first electrode plate CP3 of the second capacitor, one end is connected to the gate BT5G of the first pull-down transistor, and the other end is connected to the gate BT4G of the second output transistor, and the first electrode plate CP3 of the second capacitor has a second bottom via hole area H2A. An end of the gate BT4G of the second output transistor away from the first electrode plate CP3 of the second capacitor has an enlarged part, and the enlarged part is provided with an eleventh bottom via hole area H11A. The semiconductor layer SD is provided with an eighth top interconnection line TRB8 and a tenth top interconnection line TRB10. An end of the eighth top interconnection line TRB8 has a second top via hole area H2B, and the second bottom via hole area H2A and the second top via hole area H2B overlap each other and are electrically connected through a via hole. The eighth top interconnection line TRB8 is electrically connected to the drain BT8D of the second pull-down transistor and the drain BT6D of the first pull-down control transistor through via holes. The tenth top interconnection line TRB10 is electrically connected to the drain BT7D of the second pull-down control transistor through a via hole, and the tenth top interconnection line TRB10 has an eleventh top via hole area H11B. The eleventh bottom via hole area H11A and the eleventh top via hole area H11B overlap each other and are electrically connected through a via hole. The fourth top electrode plate CP4B has a first top via hole area H1B, and the first bottom via hole area H1A and the first top via hole area H1B overlap each other and are electrically connected through a via hole.

Referring to FIG. 5 to FIG. 8, the semiconductor layer SD is provided with a fifth bottom electrode plate CP5B, a sixteenth top interconnection line TRB16 and a seventeenth top interconnection line TRB17. The fifth bottom electrode plate CP5B has a second protrusion of the fifth electrode plate CP5LB, the fifth top electrode plate CP5A provided in the semiconductor layer SEMI has a first protrusion CP5LA of the fifth electrode plate. The first protrusion CP5LA of the fifth electrode plate and the second protrusion CP5LB of the fifth electrode plate overlap each other and are electrically connected through a via hole. The sixteenth top interconnection line TRB16 is electrically connected to the fifth bottom electrode plate CP5B, and is electrically connected to a part of the drain AT3D of the first output transistor. The seventeenth top interconnection line TRB17 is electrically connected to the fifth bottom electrode plate CP5B, and is electrically connected to the rest of the drain AT3D of the first output transistor. The seventeenth interconnection line TRB17 is further electrically connected to the drain AT4D of the second output transistor. The gate layer GT is provided with a first output line OUTLA, and an end of the seventeenth interconnection line TRB17 close to the display area AA is electrically connected to an end of the first output line OUTLA away from the display area AA through a via hole.

Referring to FIG. 5 to FIG. 8, the semiconductor layer SD is provided with a fourteenth top interconnection line TRB14 and an eighteenth top interconnection line TRB18, and the gate layer GT is provided with a sixth bottom interconnection line TRA6 and the second electrode plate CP6 of the third capacitor. An end of the fourteenth top interconnection line TRB14 close to the display area AA is provided with a sixteenth top via hole area H16B, and the second electrode plate CP6 of the third capacitor is provided with a fifteenth bottom via hole area H16A. The fifteenth bottom via hole area H16A and the sixteenth top via hole area H16B overlap each other and are electrically connected through a via hole. An end of the fourteenth interconnection line TRB14 away from the display area AA is electrically connected to the drain AT1D of the first input transistor through a via hole. The gate AT2G of the second input transistor has a protrusion provided with a fourteenth bottom via hole area H14A. The gate AT4G of the second output transistor has a protrusion provided with a fifteenth bottom via hole area H15A. Two ends of the eighteenth top interconnection line TRB18 respectively have a fourteenth top via hole area H14B and a fifteenth top via hole area H15B. The fourteenth bottom via hole area H14A and the fourteenth top via hole area H14B mutually overlap each other and are electrically connected through a via hole. The fifteenth bottom via hole area H15A and the fifteenth top via hole area H15B mutually overlap each other and are electrically connected through a via hole. An end of the sixth bottom interconnection line TRA6 is electrically connected to the gate AT1G of the first input transistor, and the other end is electrically connected to the gate AT12G of the pull-down control transistor.

Referring to FIG. 5 to FIG. 8, the semiconductor layer SD is provided with a second top interconnection line TRB2, and the gate layer GT is provided with a first bottom interconnection line TRA1. The first bottom interconnection line TRA1 is electrically connected to the gate BT1G of the first input transistor, and an end is provided with a fourth bottom via hole area H4A. The second top interconnection line TRB2 is arranged across the shift register unit group GOAS, and one end of the second top interconnection line TRB2 has a fourth top via hole area H4B. The fourth bottom via hole area H4A and the fourth top via hole area H4B overlap each other and are electrically connected through a via hole. The other end of the second top interconnection line TRB2 is electrically connected to a fifth bottom electrode plate CP5B of a first shift register unit GOAA in a preceding stage.

Referring to FIG. 5 to FIG. 8, the gate layer GT is provided with a second bottom interconnection line TRA2. One end of the second bottom interconnection line TRA2 is electrically connected to the gate BT2G of the second input transistor, and the other end of the second bottom interconnection line TRA2 has a fifth bottom via hole area H5A. The second top interconnection line TRB2 has a fifth top via hole area H5B. The fifth bottom via hole area H5A and the fifth top via hole area H5B overlap each other and are electrically connected through a via hole.

Referring to FIG. 5 to FIG. 8, the semiconductor layer SD is further provided with a thirteenth top interconnection line TRB13 and a twentieth top interconnection line TRB20. The gate layer GT is further provided with a first touch interconnection line TSA and a second touch interconnection line TSB. The first touch interconnection line TSA is electrically connected to the touch control line ENTL through a via hole, and is electrically connected to the gate BT11G of the touch control transistor. The second touch control interconnection line TSB is electrically connected to the touch control line ENTL through a via hole, and is electrically connected to the gate AT11G of the touch control transistor. The thirteenth interconnection line TRB13 is electrically connected to the second output line OUTLB through a via hole, and is electrically connected to the drain BT11D of the touch control transistor. The source BT11S of the touch control transistor is electrically connected to the second low-level interconnection line VGLLB through a via hole. The twentieth top interconnection line TRB20 is electrically connected to the first output line OUTLA through a via hole, and is electrically connected to the drain AT11D of the touch control transistor, and the source AT11S of the touch control transistor is electrically connected to the second low-level interconnection line VGLLB through a via hole.

Other embodiments of the present disclosure will be readily apparent to those skilled in the art from consideration of the specification and practice of the invention disclosed herein. The present disclosure is intended to cover any modification, use or adaptation of the present disclosure, and such modifications, uses or adaptations follow the general principles of the present disclosure and include common knowledge or conventional technical means in the technical field which is not disclosed in the present disclosure. The specification and examples are to be considered exemplary only, with the true scope and spirit of the present disclosure indicated by the appended claims.

What is claimed is:

1. A display panel, comprising a display area and a peripheral area surrounding the display area, wherein at least one gate driving circuit is arranged in the peripheral area, and each of the at least one gate driving circuit comprises a plurality of shift register units cascaded in sequence;
    wherein the plurality of shift register units comprise first shift register units and second shift register units, the first shift register units and the second shift register units are spaced apart from each other, and the number of transistors in the first shift register units is smaller than the number of transistors in the second shift register units;
    wherein the at least one gate driving circuit is provided on a side of the display area in a row direction;
    wherein the peripheral area is provided with a first circuit area for arranging a first shift register among the first shift register units and a second circuit area for arranging a second shift register among the second shift register units; and
    wherein a partial area of the second circuit area is located on a side of the first circuit area away from the display area;
    wherein each of the at least one gate driving circuit comprises a plurality of shift register unit groups, and each of the shift register unit groups comprises a first shift register unit and a second shift register unit which are adjacent to each other;
    wherein in a same shift register unit group, a first circuit area corresponding to a first shift register unit and a second circuit area corresponding to a second shift register unit are complementary to form a rectangle;
    wherein the display panel is provided with an inner line group and an outer line group corresponding to the at least one gate driving circuit, driving lines in the inner line group and the outer line group are all used to drive the at least one gate driving circuit, and the inner line group is located on a side of the outer line group close to the display area;
    wherein each of the shift register unit groups is electrically connected to any one of the driving lines in the outer line group through at most one interconnection line.

2. The display panel according to claim 1, wherein the display area is provided with a plurality of pixel driving circuits, signals output by at least part of the first shift register units and signals output by at least part of the second shift register units are used to drive the pixel driving circuit.

3. The display panel according to claim 1, wherein the outer line group comprises a first low-level signal line, a reset control line, a first scan control line and a second scan control line which extend along a column direction;
    wherein a first shift register unit and a second shift register unit, which are located in two different shift register unit groups and are adjacent to each other, are electrically connected to a same first low-level signal line;
    wherein the reset control line is used to provide a reset control signal to the shift register unit groups;
    wherein the first scan control line is used to provide a first scan control signal to the shift register unit groups, the second scan control line is used to provide a second scan control signal to the shift register unit groups, and one of the first scan control signal and the second scan control signal is an inverted signal of another one of the first scan control signal and the second scan control signal.

4. The display panel according to claim 3, wherein at least one of the first shift register units comprises a first input transistor and a second input transistor, and at least one of the second shift register units comprises a first input transistor and a second input transistor;
    wherein the first input transistor of at least one of the second shift register units is located between the first input transistor of a corresponding first shift register unit and the outer line group, and is arranged along the row direction;
    wherein the second input transistor of at least one of the second shift register units is located between the second input transistor of a corresponding first shift register unit and the outer line group, and is arranged along the row direction;
    wherein a source of the first input transistor of at least one of the first shift register units and a source of the first input transistor of a corresponding second shift register unit are electrically connected to the first scan control line through a same conductive structure;
    wherein a source of the second input transistor of at least one of the first shift register units and a source of the second input transistor of a corresponding second shift register unit are electrically connected to the second scan control line through a same conductive structure.

5. The display panel according to claim 1, wherein at least one of the first shift register units comprises:
    a first input transistor, wherein a source of the first input transistor is used to be applied with the first scan control signal, a drain of the first input transistor is electrically connected to a pull-up node, and a gate of the first input transistor is used to be electrically connected to an output terminal of a preceding-stage shift register unit;
    a second input transistor, wherein a source of the second input transistor is used to be applied with the second scan control signal, a drain of the second input transistor is electrically connected to the pull-up node, and a gate of the second input transistor is electrically connected to a pull-down node and used to be electrically connected to an output terminal of a next-stage shift register unit, and one of the first scan control signal and the second scan control signal is an inverted signal of another one of the first scan control signal and the second scan control signal;
    a third capacitor having a first electrode plate of the third capacitor and a second electrode plate of the third capacitor, wherein the second electrode plate of the third capacitor is electrically connected to the pull-up node, and the first electrode plate of the third capacitor is electrically connected to an output terminal of the first shift register unit;

a first output transistor, wherein a drain of the first output transistor is electrically connected to the first electrode plate of the third capacitor, a gate of the first output transistor is electrically connected to the pull-up node, and one of a source of the first output transistor of the first shift register unit and a source of a first output transistor of an adjacent shift register unit is used to be applied with a first clock signal, and the other one of the source of the first output transistor of the first shift register unit and the source of the first output transistor of the adjacent shift register unit is used to be applied with a second clock signal, and one of the first clock signal and the second clock signal is an inverted signal of the other one of the first clock signal and the second clock signal;

a second output transistor, wherein a source of the second output transistor is used to be applied with a low-level signal, a drain of the second output transistor is electrically connected to the first electrode plate of the third capacitor, and a gate of the second output transistor is electrically connected to the pull-down node; and a pull-down control transistor, wherein a source of the pull-down control transistor is used to be applied with the low-level signal, a drain of the pull-down control transistor is electrically connected to the pull-down node, and a gate of the pull-down control transistor is electrically connected to the gate of the first input transistor.

6. The display panel according to claim 5, wherein the first input transistor comprises two sub-transistors connected in series, and the two sub-transistors have a common gate;

wherein the second input transistor comprises two sub-transistors connected in series, and the two sub-transistors have a common gate.

7. The display panel according to claim 5, wherein at least one of the first shift register units further comprises:

a touch control transistor, wherein a source of the touch control transistor is used to be applied with the low-level signal, a drain of the touch control transistor is electrically connected to the first electrode plate of the third capacitor, and a gate of the touch control transistor is used to be applied with a touch control signal.

8. The display panel according to claim 1, wherein at least one of the second shift register unit comprises:

a first input transistor, wherein a source of the first input transistor is used to be applied with a first scan control signal, a drain of the first input transistor is used to be electrically connected to a pull-up control node, and a gate of the first input transistor is used to be electrically connected to an output terminal of a preceding-stage shift register unit;

a second input transistor, wherein a source of the second input transistor is used to be applied with a second scan control signal, a drain of the second input transistor is used to be electrically connected to the pull-up control node, and a gate of the second input transistor is used be electrically connected to an output terminal of a next-stage shift register unit, and one of the first scan control signal and the second scan control signal is an inverted signal of the other one of the first scan control signal and the second scan control signal;

a first capacitor comprising a first electrode plate of the first capacitor and a second electrode plate of the first capacitor, wherein the first electrode plate of the first capacitor is electrically connected to an output terminal of the second shift register unit, and the second electrode plate of the first capacitor is electrically connected to a pull-up node;

a second capacitor comprising a first electrode plate of the second capacitor and a second electrode plate of the second capacitor, wherein the first electrode plate of the second capacitor is electrically connected to a pull-down node, and the second electrode plate of the second capacitor is used to be applied with a low-level signal;

a first output transistor, wherein a drain of the first output transistor is electrically connected to the pull-up node, and a gate of the first output transistor is electrically connected to the first electrode plate of the first capacitor, and one of a source of the first output transistor of the second shift register unit and a source of a first output transistor of an adjacent shift register unit is used to be applied with a first clock signal, and the other one of the source of the first output transistor of the second shift register unit and the source of the first output transistor of the adjacent shift register unit is used to be applied with a second clock signal, and one of the first clock signal and the second clock signal is an inverted signal of the other one of the first clock signal and the second clock signal;

a second output transistor, wherein a source of the second output transistor is used to be applied with the low-level signal, a drain of the second output transistor is electrically connected to the first electrode plate of the first capacitor, and a gate of the second output transistor is electrically connected to the pull-down node;

a first pull-down transistor, wherein a source of the first pull-down transistor is used to be applied with the low-level signal, a drain of the first pull-down transistor is electrically connected to the pull-up control node, and a gate of the first pull-down transistor is electrically connected to the pull-down node;

a first pull-down control transistor, wherein a source of the first pull-down control transistor is used to be applied with the low-level signal, a drain of the first pull-down control transistor is electrically connected to the pull-down node, and a gate of the first pull-down control transistor is electrically connected to the pull-up control node;

a second pull-down control transistor, wherein a drain of the second pull-down control transistor is electrically connected to the pull-down node, and a gate of the second pull-down control transistor is electrically connected to a source of the second pull-down control transistor, and one of the source of the second pull-down control transistor and the source of the first output transistor is used to be applied with the first clock signal, and the other one of the source of the second pull-down control transistor and the source of the first output transistor is used to be applied with the second clock signal;

a second pull-down transistor, wherein a source of the second pull-down transistor is used to be applied with the low-level signal, a drain of the second pull-down transistor is electrically connected to the pull-down node, and a gate of the second pull-down transistor is electrically connected to the first electrode plate of the first capacitor; and a reset transistor, wherein a source of the reset transistor is used to be applied with the low-level signal, a drain of the reset transistor is electrically connected to the pull-up control node, and a gate of the reset transistor is used to be applied with a reset control signal;
wherein the pull-up control node is electrically connected to the pull-up node.

9. The display panel according to claim 8, wherein the first input transistor comprises two sub-transistors connected in series, and the two sub-transistors have a common gate;
wherein the second input transistor comprises two sub-transistors connected in series, and the two sub-transistors have a common gate.

10. The display panel according to claim 8, wherein at least one of the second shift register units further comprises an enable transistor and a touch control transistor, and the pull-up control node and the pull-up node are electrically connected through the enable transistor;
wherein a source of the enable transistor is electrically connected to the pull-up control node, a drain of the enable transistor is electrically connected to the pull-up node, and a gate of the enable transistor is used to be applied with a high-level signal;
wherein a source of the touch control transistor is electrically connected to the low-level signal, a drain of the touch control transistor is electrically connected to the first electrode plate of the first capacitor, and a gate of the touch control transistor is used to be applied with a touch control signal, and one of the touch control signal and the high-level signal is an inverted signal of the other one of the touch control signal and the high-level signal.

11. The display panel according to claim 1, wherein the at least one gate driving circuit comprises two gate driving circuits, and the two gate driving circuits are respectively located on both sides of the display area;
wherein pixel driving circuits in any one row are simultaneously driven by the two gate driving circuits.

12. The display panel according to claim 11, wherein pixel driving circuits in any one row are driven by a first shift register unit in one of the gate driving circuits, and is driven by a second shift register unit in the other one of the gate driving circuits.

13. A gate driving circuit, comprising a plurality of shift register units cascaded in sequence, wherein the plurality of shift register units comprise first shift register units and second shift register units, the first shift register units and the second shift register units are spaced apart from each other, and the number of transistors in the first shift register units is smaller than the number of transistors in the second shift register units;
wherein each of the shift register units is used to drive a row of pixel driving circuits;
wherein at least one of the first shift register units comprises:
a first input transistor, wherein a source of the first input transistor is used to be applied with a first scan control signal, a drain of the first input transistor is electrically connected to a pull-up node, and a gate of the first input transistor is used to be electrically connected to an output terminal of a preceding-stage shift register unit;
a second input transistor, wherein a source of the second input transistor is used to be applied with a second scan control signal, a drain of the second input transistor is electrically connected to the pull-up node, and a gate of the second input transistor is electrically connected to a pull-down node and is used to be electrically connected to an output terminal of a next-stage shift register unit, and one of the first scan control signal and the second scan control signal is an inverted signal of the other one of the first scan control signal and the second scan control signal;
a third capacitor having a first electrode plate of the third capacitor and a second electrode plate of the third capacitor, wherein the second electrode plate of the third capacitor is electrically connected to the pull-up node, and the first electrode plate of the third capacitor is electrically connected to an output terminal of the first shift register unit;
a first output transistor, wherein a drain of the first output transistor is electrically connected to the first electrode plate of the third capacitor, a gate of the first output transistor is electrically connected to the pull-up node, and one of a source of the first output transistor of the first shift register unit and a source of a first output transistor of an adjacent shift register unit is used to be applied with a first clock signal, and the other one of the source of the first output transistor of the first shift register unit and the source of the first output transistor of the adjacent shift register unit is used to be applied with a second clock signal, and one of the first clock signal and the second clock signal is an inverted signal of the other one of the first clock signal and the second clock signal;
a second output transistor, wherein a source of the second output transistor is used to be applied with a low-level signal, a drain of the second output transistor is electrically connected to the first electrode plate of the third capacitor, and a gate of the second output transistor is electrically connected to the pull-down node;
a pull-down control transistor, wherein a source of the pull-down control transistor is used to be applied with the low-level signal, a drain of the pull-down control transistor is electrically connected to the pull-down node, and a gate of the pull-down control transistor is electrically connected to the gate of the first input transistor.

14. The gate driving circuit according to claim 13, wherein the first input transistor comprises two sub-transistors connected in series, and the two sub-transistors have a common gate;
wherein the second input transistor comprises two sub-transistors connected in series, and the two sub-transistors have a common gate.

15. The gate driving circuit according to claim 13, wherein at least one of the second shift register units comprises:
a first input transistor, wherein a source of the first input transistor is used to be applied with a first scan control signal, a drain of the first input transistor is used to be electrically connected to a pull-up control node, and a gate of the first input transistor is used to be electrically connected to an output terminal of a preceding-stage shift register unit;
a second input transistor, wherein a source of the second input transistor is used to be applied with a second scan control signal, a drain of the second input transistor is used to be electrically connected to the pull-up control node, a gate of the second input transistor is used to be electrically connected to an output terminal of a next-stage shift register unit, and one of the first scan control signal and the second scan control signal is an inverted signal of the other one of the first scan control signal and the second scan control signal;
a first capacitor comprising a first electrode plate of the first capacitor and a second electrode plate of the first capacitor, wherein the first electrode plate of the first capacitor is electrically connected to an output terminal of the second shift register unit, and the second electrode plate of the first capacitor is electrically connected to a pull-up node;

a second capacitor comprising a first electrode plate of the second capacitor and a second electrode plate of the second capacitor, wherein the first electrode plate of the second capacitor is electrically connected to a pull-down node, and the second electrode plate of the second capacitor is used to be applied with a low-level signal;

a first output transistor, wherein a drain of the first output transistor is electrically connected to the pull-up node, a drain of the first output transistor is electrically connected to the first electrode plate of the first capacitor, and one of a source of the first output transistor of the second shift register unit and a source of a first output transistor of an adjacent shift register unit is used to be applied with a first clock signal, and the other one of the source of the first output transistor of the second shift register unit and the source of the first output transistor of the adjacent shift register unit is used to be applied with a second clock signal, and one of the first clock signal and the second clock signal is an inverted signal of the other one of the first clock signal and the second clock signal;

a second output transistor, wherein a source of the second output transistor is used to be applied with the low-level signal, a drain of the second output transistor is electrically connected to the first electrode plate of the first capacitor, and a gate of the second output transistor is electrically connected to the pull-down node;

a first pull-down transistor, wherein a source of the first pull-down transistor is used to be applied with the low-level signal, a drain of the first pull-down transistor is electrically connected to the pull-up control node, and a gate of the first pull-down transistor is electrically connected to the pull-down node;

a first pull-down control transistor, wherein a source of the first pull-down control transistor is used to be applied with the low-level signal, a drain of the first pull-down control transistor is electrically connected to the pull-down node, and a gate of the pull-down control transistor is electrically connected to the pull-up control node;

a second pull-down control transistor, wherein a drain of the second pull-down control transistor is electrically connected to the pull-down node, a gate of the second pull-down control transistor is electrically connected to a source of the second pull-down control transistor, and one of the source of the second pull-down control transistor and the source of the first output transistor is used to be applied with the first clock signal, and the other one of the source of the second pull-down control transistor and the source of the first output transistor is used to be applied with the second clock signal;

a second pull-down transistor, wherein a source of the second pull-down transistor is used to be applied with the low-level signal, a drain of the second pull-down transistor is electrically connected to the pull-down node, and a gate of the second pull-down transistor is electrically connected to the first electrode plate of the first capacitor; and a reset transistor, wherein a source of the reset transistor is used to be applied with the low-level signal, a drain of the reset transistor is electrically connected to the pull-up control node, and a gate of the reset transistor is used to be applied with a reset control signal;

wherein the pull-up control node is electrically connected to the pull-up node.

16. The gate driving circuit according to claim 15, wherein the first input transistor comprises two sub-transistors connected in series, and the two sub-transistors have a common gate;

wherein the second input transistor comprises two sub-transistors connected in series, and the two sub-transistors have a common gate.

* * * * *